(12) United States Patent
Kim et al.

(10) Patent No.: US 9,578,148 B2
(45) Date of Patent: Feb. 21, 2017

(54) SMARTPHONE CAPABLE OF DETECTING TOUCH POSITION AND PRESSURE

(71) Applicant: HiDeep Inc., Gyeonggi-do (KR)

(72) Inventors: Bonkee Kim, Gyeonggi-do (KR); Seyeob Kim, Gyeonggi-do (KR); Sangsic Yoon, Gyeonggi-do (KR); Sunyoung Kwon, Gyeonggi-do (KR); Hojun Moon, Gyeonggi-do (KR); Taehoon Kim, Gyeonggi-do (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 14/791,702

(22) Filed: Jul. 6, 2015

(65) Prior Publication Data
US 2016/0088133 A1    Mar. 24, 2016

(30) Foreign Application Priority Data

Sep. 19, 2014  (KR) .................. 10-2014-0124920
Apr. 30, 2015  (KR) .................. 10-2015-0061358

(51) Int. Cl.
| | |
|---|---|
| G06F 3/045 | (2006.01) |
| H04M 1/02 | (2006.01) |
| G06F 3/044 | (2006.01) |
| G06F 3/041 | (2006.01) |
| G02F 1/1333 | (2006.01) |

(52) U.S. Cl.
CPC ........ *H04M 1/0266* (2013.01); *G02F 1/13338* (2013.01); *G06F 3/044* (2013.01); *G06F 3/0414* (2013.01); *G06F 3/0416* (2013.01); *G06F 2203/04105* (2013.01); *G06F 2203/04106* (2013.01)

(58) Field of Classification Search
None
See application file for complete search history.

(56) References Cited

U.S. PATENT DOCUMENTS

| | | |
|---|---|---|
| 5,510,813 A | 4/1996 | Makinwa et al. |
| 1,016,876 A1 | 6/2015 | Yonemum |
| 2003/0007238 A1 | 1/2003 | Liang et al. |

(Continued)

FOREIGN PATENT DOCUMENTS

| | | |
|---|---|---|
| CN | 1032157779 | 8/2013 |
| CN | 203380194 | 1/2014 |

(Continued)

OTHER PUBLICATIONS

International Search Report for Corresponding Application No. PCT/KR2014/006907, mailed Nov. 28, 2014.

(Continued)

*Primary Examiner* — Ilana Spar
*Assistant Examiner* — Kirk Hermann
(74) *Attorney, Agent, or Firm* — The Belles Group, P.C.

(57) ABSTRACT

A smartphone may be provided that includes: a cover layer; an LCD panel; a backlight unit which is located under the LCD panel; a pressure electrode which is located under the backlight unit; a shielding member which is located under the pressure electrode; and a converter which converts a signal comprising information for a capacitance change amount outputted from the pressure electrode to a digital signal. A magnitude of a touch pressure is detected from the digital signal.

24 Claims, 16 Drawing Sheets

(56) References Cited

U.S. PATENT DOCUMENTS

| | | |
|---|---|---|
| 2004/0227736 A1 | 11/2004 | Kamrath et al. |
| 2008/0062139 A1* | 3/2008 | Hotelling ............ G02F 1/13338 345/173 |
| 2008/0062140 A1 | 3/2008 | Hotelling et al. |
| 2008/0202251 A1 | 8/2008 | Serban et al. |
| 2010/0024573 A1 | 2/2010 | Daverman et al. |
| 2010/0033354 A1 | 2/2010 | Ejlersen |
| 2010/0123672 A1 | 5/2010 | Kim et al. |
| 2010/0309030 A1 | 12/2010 | Huang et al. |
| 2010/0321609 A1* | 12/2010 | Qi ....................... G02B 6/0036 349/62 |
| 2011/0023631 A1* | 2/2011 | Sleeman ............... G06F 3/0414 73/862.626 |
| 2011/0037726 A1 | 2/2011 | Lee |
| 2011/0115738 A1 | 5/2011 | Suzuki et al. |
| 2011/0126900 A1 | 6/2011 | Inoue et al. |
| 2011/0157087 A1 | 6/2011 | Kanehira et al. |
| 2011/0175845 A1 | 7/2011 | Honda et al. |
| 2012/0038583 A1 | 2/2012 | Westhues et al. |
| 2012/0050195 A1 | 3/2012 | Heo et al. |
| 2012/0068965 A1 | 3/2012 | Wada et al. |
| 2012/0105340 A1 | 5/2012 | Beom et al. |
| 2012/0113361 A1 | 5/2012 | Huang et al. |
| 2012/0127095 A1 | 5/2012 | Jun |
| 2012/0180575 A1 | 7/2012 | Sakano et al. |
| 2013/0016059 A1 | 1/2013 | Lowles et al. |
| 2013/0016060 A1 | 1/2013 | Pereverzev et al. |
| 2013/0033450 A1 | 2/2013 | Coulson et al. |
| 2013/0234734 A1 | 9/2013 | Iida et al. |
| 2013/0257784 A1 | 10/2013 | Vandermeijden et al. |
| 2014/0049506 A1 | 2/2014 | Lin |
| 2014/0062934 A1 | 3/2014 | Coulson et al. |
| 2014/0078080 A1 | 3/2014 | Kim et al. |
| 2014/0204049 A1 | 7/2014 | Tsai et al. |
| 2014/0210791 A1 | 7/2014 | Hanauer et al. |
| 2015/0169121 A1 | 6/2015 | Yao et al. |
| 2015/0212633 A1 | 7/2015 | Yamagishi et al. |
| 2015/0370373 A1 | 12/2015 | Barel |
| 2016/0034087 A1 | 2/2016 | Kim et al. |
| 2016/0035290 A1 | 2/2016 | Kim et al. |
| 2016/0062500 A1 | 3/2016 | Kessler et al. |
| 2016/0085336 A1 | 3/2016 | Kim et al. |
| 2016/0088133 A1 | 3/2016 | Kim et al. |

FOREIGN PATENT DOCUMENTS

| | | | |
|---|---|---|---|
| JP | 2007322587 | 12/2007 | |
| JP | 2009163363 | 7/2009 | |
| JP | 2010244514 | 10/2010 | |
| JP | 2011081578 | 4/2011 | |
| JP | 2011086191 | 4/2011 | |
| JP | 1033154 | 5/2011 | |
| JP | 2011258043 | 12/2011 | |
| JP | 2012235224 | 11/2012 | |
| JP | 2013088932 | 5/2013 | |
| JP | 2013105154 | 5/2013 | |
| JP | 2013242770 | 12/2013 | |
| JP | 20130131647 | 12/2013 | |
| JP | 2014194591 | 10/2014 | |
| JP | 5798700 | 10/2015 | |
| KR | 200900776126 | 7/2009 | |
| KR | 20100025176 | 3/2010 | |
| KR | 20110039304 | 4/2011 | |
| KR | 1020110128724 | 11/2011 | |
| KR | 20120053716 | 5/2012 | |
| KR | 20120139518 | 12/2012 | |
| KR | 101311235 | 9/2013 | |
| KR | 1020130127176 | 11/2013 | |
| KR | 1020140096905 | 8/2014 | |
| KR | 20150011271 | 1/2015 | |
| KR | 101506511 | 4/2015 | |
| WO | WO2011013588 | 2/2011 | |
| WO | WO2011111906 | 9/2011 | |
| WO | WO2014017248 | 1/2014 | |
| WO | WO2014080924 | 5/2014 | |
| WO | WO2015106183 | 7/2015 | |
| WO | WO 2015106183 A1 * | 7/2015 | ............... G01L 1/18 |

OTHER PUBLICATIONS

Corresponding U.S. Appl. No. 14/992,568, filed Jan. 11, 2016.
Corresponding U.S. Appl. No. 15/007,240, filed Jan. 27, 2016.
Corresponding U.S. Appl. No. 15/009,951, filed Jan. 29, 2016.
Corresponding U.S. Appl. No. 14/992,668, filed Jan. 11, 2016.
Corresponding U.S. Appl. No. 15/007,245, filed Jan. 27, 2016.
Corresponding U.S. Appl. No. 15/009,973, filed Jan. 29, 2016.
Corresponding U.S. Appl. No. 14/820,942, filed Aug. 7, 2015.
Correspondirn U.S. Appl. No. 14/908;706, filed Jan. 29, 2016.
Corresponding U.S. Appl. No. 15/071,561, filed Mar. 16, 2016.

* cited by examiner

SMARTPHONE CAPABLE OF DETECTING TOUCH POSITION AND PRESSURE

CROSS REFERENCE TO RELATED APPLICATIONS

Priority is claimed under 35 U.S.C. §119 to Korean Patent Application No.: 10-2014-0124920, filed Sep. 19, 2014, and Korean Patent Application No.: 10-2015-0061358, filed Apr. 30, 2015, the disclosures of which are incorporated herein by reference in their entireties.

FIELD OF THE INVENTION

The present invention relates to a smartphone, and more particularly to a smartphone capable of simultaneously detecting a touch position and a touch pressure.

BACKGROUND OF THE INVENTION

Various kinds of input devices for operating a computing system, for example, a button, key, joystick and touch screen, etc., are being developed and used. The touch screen has a variety of advantages, e.g., ease of operation, miniaturization of products and simplification of the manufacturing process, the most attention is paid to the touch screen.

The touch screen may constitute a touch surface of a touch input device including a touch sensor panel which may be a transparent panel including a touch-sensitive surface. The touch sensor panel is attached to the front side of a display screen, and then the touch-sensitive surface may cover the visible side of the display screen. The touch screen allows a user to operate the computing system by simply touching the touch screen by a finger, etc. Generally, the computing system recognizes the touch and a touch position on the touch screen and analyzes the touch, and thus, performs the operations in accordance with the analysis.

Here, there is a demand for a detection device capable of detecting the touch position and touch pressure at the same time without degrading the performance of a display module.

SUMMARY OF THE INVENTION

One embodiment is a smartphone including: a cover layer; an LCD panel which is located under the cover layer and comprises a liquid crystal layer, and a first glass layer and a second glass layer between which the liquid crystal layer is placed, wherein at least a portion of a touch sensor which senses touch in a capacitive manner is located between the first glass layer and the second glass layer; a backlight unit which is located under the LCD panel; a pressure electrode which is located under the backlight unit; a shielding member which is located under the pressure electrode; and a converter which converts a signal comprising information for a capacitance change amount outputted from the pressure electrode to a digital signal. The touch sensor may include a plurality of drive electrodes and a plurality of receiving electrodes. A driving signal may be applied to the touch sensor and a touch position may be detected from a sensing signal which is outputted from the touch sensor. A magnitude of a touch pressure may be detected from the digital signal.

Another embodiment is a smartphone including: a cover layer; an LCD panel which is located under the cover layer and comprises a liquid crystal layer, and a first glass layer and a second glass layer between which the liquid crystal layer is placed, wherein at least a portion of a touch sensor which senses touch in a capacitive manner is located between the first glass layer and the second glass layer; a backlight unit which is located under the LCD panel and comprises a light source and a reflection plate; a pressure electrode which is located under the backlight unit; a shielding member which is located under the pressure electrode; and a converter which converts a signal comprising information for a capacitance change amount outputted from the pressure electrode to a digital signal. The touch sensor may include a plurality of drive electrodes and a plurality of receiving electrodes. The smartphone may further include: a drive unit which applies a driving signal to the touch sensor; a sensing unit which receives a sensing signal from the touch sensor and detects a touch position; and a pressure detector which detects a magnitude of a touch pressure from the digital signal. The converter and the pressure detector may be provided as separate components.

Further another is a smartphone including: a cover layer; an LCD panel which is located under the cover layer and comprises a liquid crystal layer, and a first glass layer and a second glass layer between which the liquid crystal layer is placed, wherein at least a portion of a touch sensor which senses touch in a capacitive manner is located between the first glass layer and the second glass layer; a backlight unit which is located under the LCD panel; a pressure electrode which is located under the backlight unit; a reference potential layer spaced from the pressure electrode; and a converter which converts a signal comprising information for a capacitance change amount outputted from the pressure electrode to a digital signal. The touch sensor may include a plurality of drive electrodes and a plurality of receiving electrodes. A driving signal may be applied to the touch sensor and a touch position may be detected from a sensing signal which is outputted from the touch sensor. A magnitude of a touch pressure may be detected from the digital signal. The capacitance change amount may change depending on a distance between the pressure electrode and the reference potential layer.

BRIEF DESCRIPTION OF THE DRAWINGS

FIG. 4d is a cross sectional view showing a case where a pressure has been applied to the touch input device shown in FIG. 4a;

DETAILED DESCRIPTION OF THE INVENTION

Figure 1:
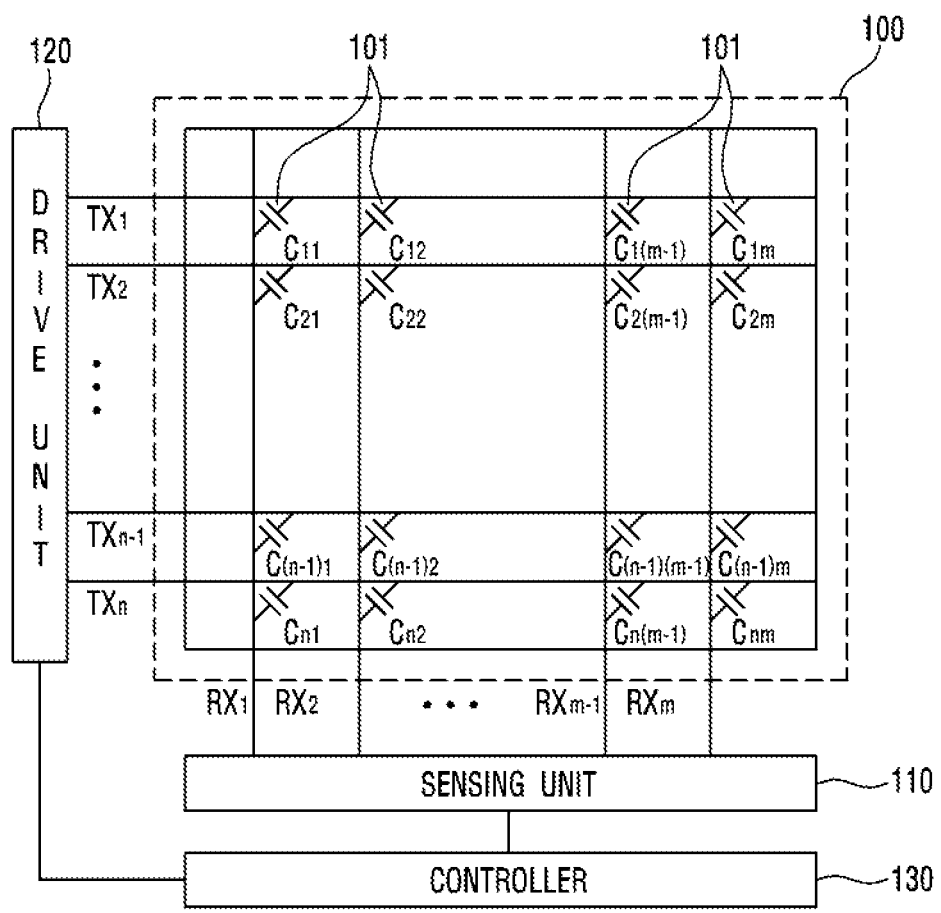
FIG. 1 is a schematic view of a configuration of a capacitance type touch sensor panel and the operation thereof in accordance with an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

FIGS. 1 to 8 are views for describing the basic operation principle of a touch input device 1000 according to an embodiment of the present invention. In particular, the following description of a method for detecting a touch position and a touch pressure can be commonly applied to first to sixth embodiments described below.

FIG. 1 is a schematic view of a configuration of a capacitance touch sensor panel 100 and the operation thereof. Referring to FIG. 1, the touch sensor panel 100 according to the embodiment of the present invention may include a plurality of drive electrodes TX1 to TXn and a plurality of receiving electrodes RX1 to RXm, and may include a drive unit 120 which applies a driving signal to the plurality of drive electrodes TX1 to TXn for the purpose of the operation of the touch sensor panel 100, and a sensing unit 110 which detects the touch and the touch position by receiving a sensing signal including information on the capacitance change amount changing according to the touch on the touch surface of the touch sensor panel 100.

As shown in FIG. 1, the touch sensor panel 100 may include the plurality of drive electrodes TX1 to TXn and the plurality of receiving electrodes RX1 to RXm. While FIG. 1 shows that the plurality of drive electrodes TX1 to TXn and the plurality of receiving electrodes RX1 to RXm of the touch sensor panel 100 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitude of the value may be different.

As shown in FIG. 1, the plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

In the touch sensor panel 100, i.e., a component of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on the same side of an insulation layer (not shown). Also, the plurality of drive electrodes TX1 to TXn and the plurality of receiving electrodes RX1 to RXm may be formed in the different layers. For example, the plurality of drive electrodes TX1 to TXn and the plurality of receiving electrodes RX1 to RXm may be formed on both sides of one insulation layer (not shown) respectively, or the plurality of drive electrodes TX1 to TXn may be formed on a side of a first insulation layer (not shown) and the plurality of receiving electrodes RX1 to RXm may be formed on a side of a second insulation layer (not shown) different from the first insulation layer.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may be formed to include at least any one of silver ink, copper or carbon nanotube (CNT). Also, the drive electrode TX and the receiving electrode RX may be made of metal mesh or nano silver.

The drive unit 120, i.e., a component of the touch input device 1000 according to the embodiment of the present invention may apply a driving signal to the drive electrodes TX1 to TXn. In the touch input device 1000 according to the embodiment of the present invention, one driving signal may be sequentially applied at a time to the first drive electrode TX1 to the n-th drive electrode TXn. The driving signal may be applied again repeatedly. This is only an example. The driving signal may be applied to the plurality of drive electrodes at the same time in accordance with the embodiment.

Through the receiving electrodes RX1 to RXm, the sensing unit 110 receives the sensing signal including information on a capacitance (Cm) 101 generated between the receiving electrodes RX1 to RXm and the drive electrodes TX1 to TXn to which the driving signal has been applied, thereby detecting whether or not the touch has occurred and where the touch has occurred. For example, the sensing signal may be a signal coupled by the capacitance (CM) 101 generated between the receiving electrode RX and the drive electrode TX to which the driving signal has been applied. As such, the process of sensing the driving signal applied from the first drive electrode TX1 to the n-th drive electrode TXn through the receiving electrodes RX1 to RXm can be referred to as a process of scanning the touch sensor panel 100.

For example, the sensing unit 110 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 101, and then converts the integrated current signal into voltage. The sensing unit 110 may further include an analog to digital converter (ADC) (not shown) which converts the integrated data by the receiver into digital data. Later, the digital data may be input to a processor (not shown) and processed to obtain information on the touch on the touch sensor panel 100. The sensing unit 110 may include the ADC and processor as well as the receiver.

A controller 130 may perform a function of controlling the operations of the drive unit 120 and the sensing unit 110. For example, the controller 130 generates and transmits a drive control signal to the drive unit 120, so that the driving signal can be applied to a predetermined drive electrode TX1 at a predetermined time. Also, the controller 130 generates and transmits the drive control signal to the sensing unit 110, so that the sensing unit 110 may receive the sensing signal from the predetermined receiving electrode RX at a predetermined time and perform a predetermined function.

Figure 10:
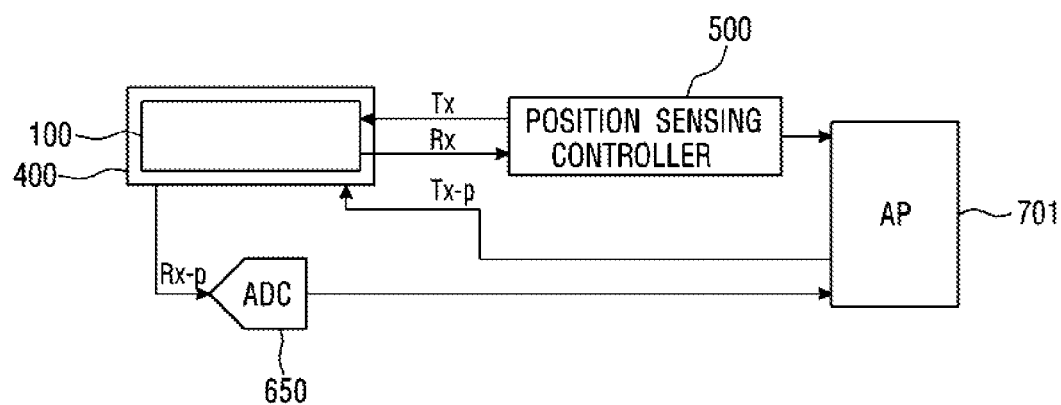
Figure 11:
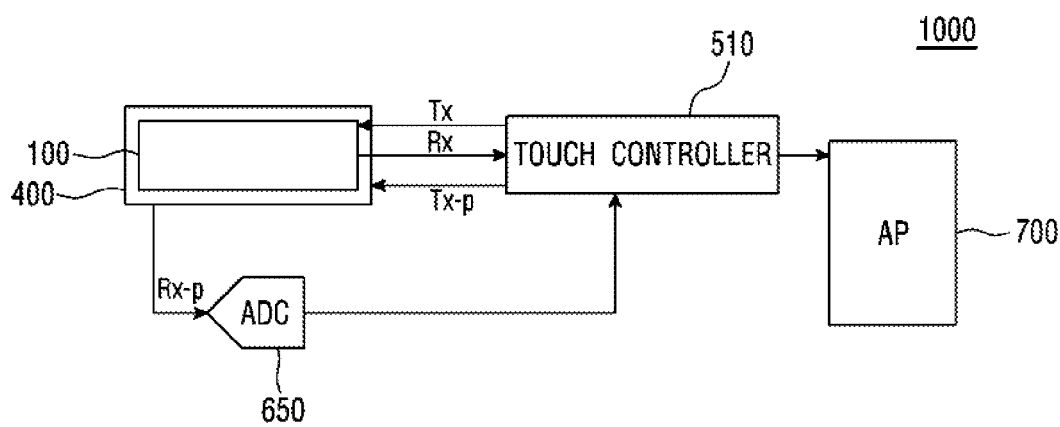
Figure 12:
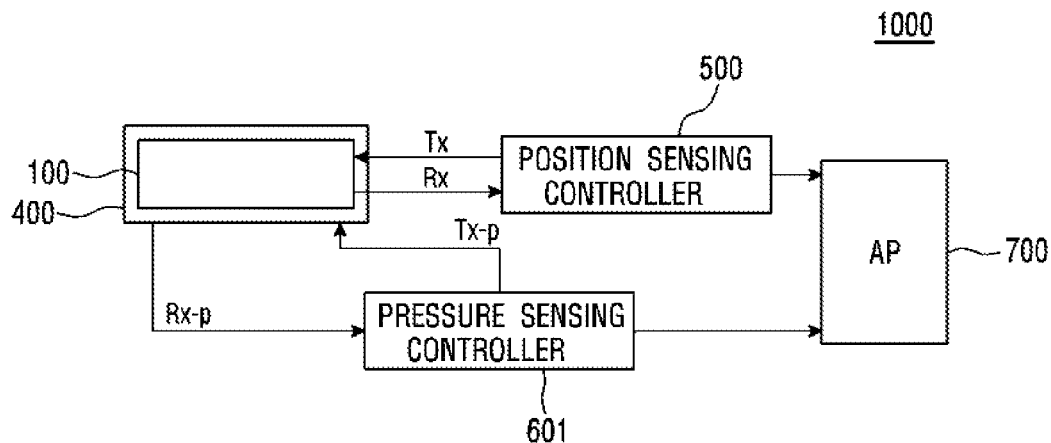
Figure 13:
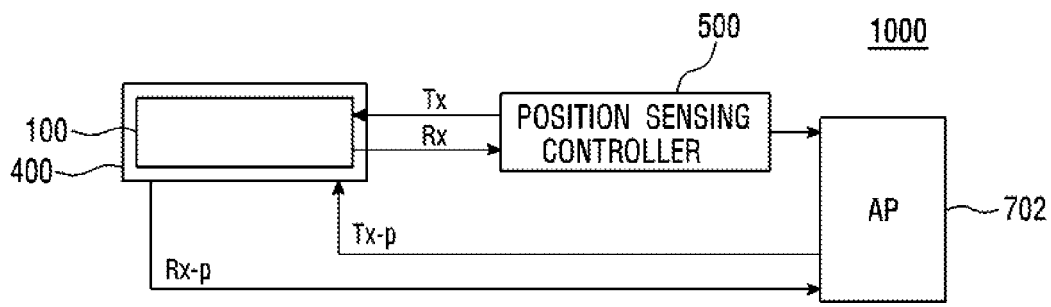
Figure 14:
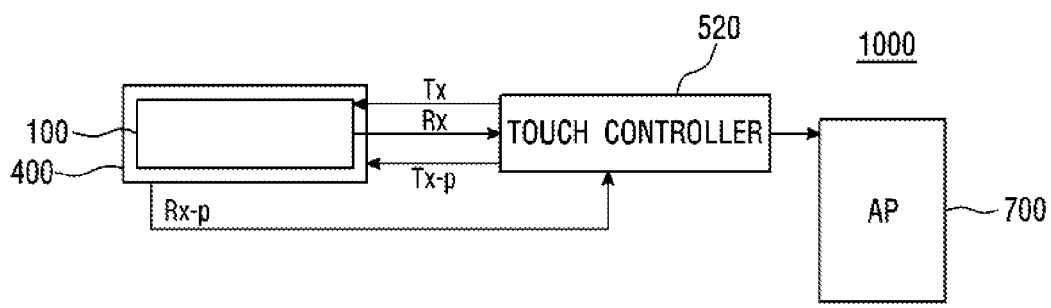

In FIG. 1, the drive unit 120 and the sensing unit 110 may constitute a touch detection device (not shown) capable of detecting whether the touch has occurred on the touch sensor panel 100 of the touch input device 1000 according to the embodiment of the present invention or not and where the touch has occurred. The touch input device 1000 according to the embodiment of the present invention may further include the controller 130. The touch detection device according to the embodiment of the present invention may be integrated and implemented on a touch sensing integrated circuit (IC, see reference numeral 150 of FIG. 10) in a touch input device 1000 including the touch sensor panel 100. The drive electrode TX and the receiving electrode RX included in the touch sensor panel 100 may be connected to the drive unit 120 and the sensing unit 110 included in the touch sensing IC 150 through, for example, a conductive trace and/or a conductive pattern printed on a circuit board, or the like.

As described above, a capacitance (C) with a predetermined value is generated at each crossing of the drive electrode TX and the receiving electrode RX. When an object like a finger approaches close to the touch sensor panel 100, the value of the capacitance may be changed. In FIG. 1, the capacitance may represent a mutual capacitance (Cm). The sensing unit 110 senses such electrical characteristics, thereby being able to sense whether the touch has occurred on the touch sensor panel 100 or not and where the touch has occurred. For example, the sensing unit 110 is able to sense whether the touch has occurred on the surface of the touch sensor panel 100 comprised of a two-dimensional plane consisting of a first axis and a second axis.

More specifically, when the touch occurs on the touch sensor panel 100, the drive electrode TX to which the driving signal has been applied is detected, so that the position of the second axial direction of the touch can be detected. Likewise, when the touch occurs on the touch sensor panel 100, the capacitance change is detected from the reception signal received through the receiving electrode RX, so that the position of the first axial direction of the touch can be detected.

The mutual capacitance type touch sensor panel as the touch sensor panel 100 has been described in detail in the foregoing. However, in the touch input device 1000 according to the embodiment of the present invention, the touch sensor panel 100 for detecting whether or not the touch has occurred and where the touch has occurred may be implemented by using not only the above-described method but also any touch sensing method like a self-capacitance type method, a surface capacitance type method, a projected capacitance type method, a resistance film method, a surface acoustic wave (SAW) method, an infrared method, an optical imaging method, a dispersive signal technology, and an acoustic pulse recognition method, etc.

The touch sensor panel 100 for detecting where the touch has occurred in the touch input device 1000 according to the embodiment of the present invention may be positioned outside or inside a display module 200.

The display module of the touch input device 1000 according to the embodiment of the present invention may be a display panel included in a liquid crystal display (LCD), a plasma display panel (PDP), an organic light emitting diode (OLED), etc. Accordingly, a user may perform the input operation by touching the touch surface while visually identifying an image displayed on the display panel.

Here, the display module 200 may include a control circuit which receives an input from an application processor (AP) or a central processing unit (CPU) on a main board for the operation of the touch input device 1000 and displays the contents that the user wants on the display panel.

Here, the control circuit for the operation of the display module 200 may include a display panel control IC, a graphic controller IC, and a circuit required to operate other display panels 200.

Figure 2A:
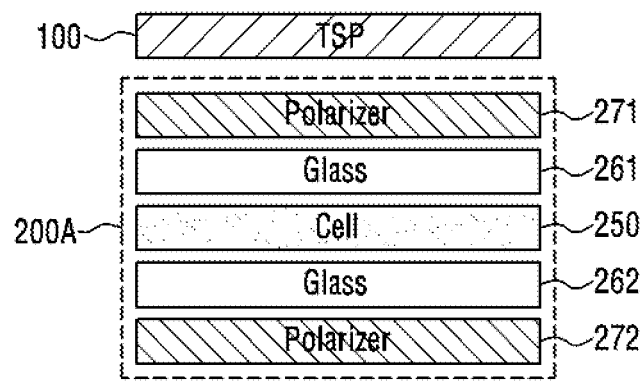
FIGS. 2a, 2b and 2c are conceptual views showing a relative position of the touch sensor panel with respect to a display module in a touch input device according to the embodiment of the present invention.
Figure 2B:
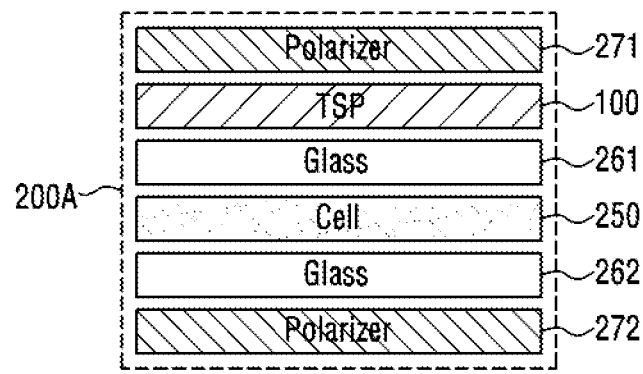
Figure 2C:
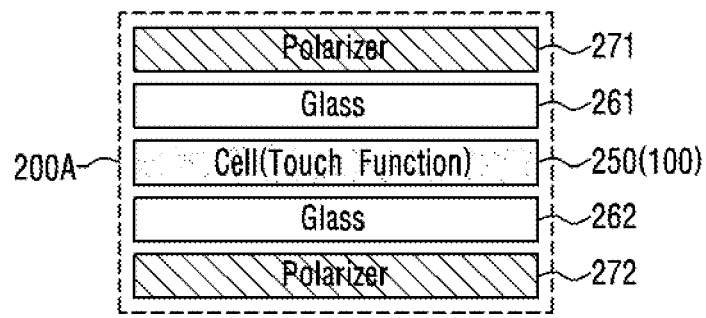

FIGS. 2*a*, 2*b* and 2*c* are conceptual views showing a relative position of the touch sensor panel with respect to the display module in the touch input device 1000 according to the embodiment of the present invention. While FIGS. 2*a* to 2*c* show an LCD panel as a display panel, this is just an example. Any display panel may be applied to the touch input device 1000 according to the embodiment of the present invention.

In this specification, the reference numeral 200A may designate the display panel included in the display module 200. As shown in FIG. 2, the LCD panel 200A may include a liquid crystal layer 250 including a liquid crystal cell, a first glass layer 261 and a second glass layer 262 which are disposed on both sides of the liquid crystal layer 250 and include electrodes, a first polarizer layer 271 formed on a side of the first glass layer 261 in a direction facing the liquid crystal layer 250, and a second polarizer layer 272 formed on a side of the second glass layer 262 in the direction facing the liquid crystal layer 250. It is clear to those skilled in the art that the LCD panel may further include other configurations for the purpose of performing the displaying function and may be transformed.

FIG. 2*a* shows that the touch sensor panel 100 of the touch input device 1000 is disposed outside the display module 200. The touch surface of the touch input device 1000 may be the surface of the touch sensor panel 100. In FIG. 2*a*, the top surface of the touch sensor panel 100 is able to function as the touch surface. Also, according to the embodiment, the touch surface of the touch input device 1000 may be the outer surface of the display module 200. In FIG. 2*a*, the bottom surface of the second polarizer layer 272 of the display module 200 is able to function as the touch surface. Here, in order to protect the display module 200, the bottom surface of the display module 200 may be covered with a cover layer (not shown) like glass.

FIGS. 2*b* and 2*c* show that the touch sensor panel 100 of the touch input device 1000 is disposed inside the display panel 200A. Here, in FIG. 2*b*, the touch sensor panel 100 for detecting the touch position is disposed between the first glass layer 261 and the first polarizer layer 271. Here, the touch surface of the touch input device 1000 is the outer surface of the display module 200. The top surface or bottom surface of the display module 200 in FIG. 2*b* may be the touch surface. FIG. 2*c* shows that the touch sensor panel 100 for detecting the touch position is included in the liquid crystal layer 250. Here, the touch surface of the touch input device 1000 is the outer surface of the display module 200. The top surface or bottom surface of the display module 200 in FIG. 2*c* may be the touch surface. In FIGS. 2*b* and 2*c*, the top surface or bottom surface of the display module 200, which can be the touch surface, may be covered with a cover layer (not shown) like glass.

The foregoing has described whether the touch has occurred on the touch sensor panel 100 according to the embodiment of the present or not and where the touch has occurred. Further, through use of the touch sensor panel 100 according to the embodiment of the present, it is possible to detect the magnitude of the touch pressure as well as whether the touch has occurred or not and where the touch has occurred. Also, apart from the touch sensor panel 100, it is possible to detect the magnitude of the touch pressure by further including the pressure detection module which detects the touch pressure.

Figure 3:
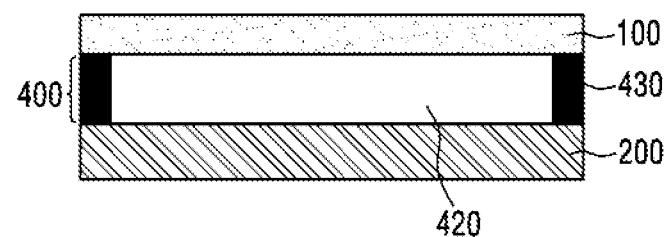
FIG. 3 is a cross sectional view of the touch input device configured to detect the touch position and touch pressure in accordance with the embodiment of the present invention.

FIG. 3 is a cross sectional view of the touch input device configured to detect the touch position and touch pressure in accordance with the embodiment of the present invention.

In the touch input device 1000 including the display module 200, the touch sensor panel 100 and the pressure detection module 400 which detect the touch position may be attached on the front side of the display module 200, As a result, the display screen of the display module 200 can be protected and the touch detection sensitivity of the touch sensor panel 100 can be improved.

Here, the pressure detection module 400 may be operated apart from the touch sensor panel 100 which detects the touch position. For example, the pressure detection module 400 may be configured to detect only the touch pressure independently of the touch sensor panel 100 which detects the touch position. Also, the pressure detection module 400 may be configured to be coupled to the touch sensor panel 100 which detects the touch position and to detect the touch pressure. For example, at least one of the drive electrode TX and the receiving electrode RX included in the touch sensor panel 100 which detects the touch position may be used to detect the touch pressure.

FIG. 3 shows that the pressure detection module 400 is coupled to the touch sensor panel 100 and detects the touch pressure. In FIG. 3, the pressure detection module 400 includes a spacer layer 420 which leaves a space between the touch sensor panel 100 and the display module 200. The pressure detection module 400 may include a reference potential layer spaced from the touch sensor panel 100 by the spacer layer 420. Here, the display module 200 may function as the reference potential layer.

The reference potential layer may have any potential which causes the change of the capacitance 101 generated between the drive electrode TX and the receiving electrode RX. For instance, the reference potential layer may be a ground layer having a ground potential. The reference potential layer may be the ground layer of the display module 200. Here, the reference potential layer may have a parallel plane with the two-dimensional plane of the display module 200. As shown in FIG. 3, the touch sensor panel 100 is disposed apart from the display module 200, i.e., the reference potential layer. Here, depending on a method for adhering the touch sensor panel 100 to the display module 200, the spacer layer 420 may be implemented in the form of an air gap between the touch sensor panel 100 and the display module 200.

Here, a double adhesive tape (DAT) 430 may be used to fix the touch sensor panel 100 and the display module 200. For example, the areas the touch sensor panel 100 and the display module 200 are overlapped with each other. The touch sensor panel 100 and the display module 200 are adhered to each other by adhering the edge portions of the touch sensor panel 100 and the display module 200 through use of the DAT 430. The rest portions of the touch sensor panel 100 and the display module 200 may be spaced apart from each other by a predetermined distance "d".

In general, even when the touch surface is touched without bending the touch sensor panel 100, the capacitance (Cm) 101 between the drive electrode TX and the receiving electrode RX is changed. That is, when the touch occurs on the touch sensor panel 100, the mutual capacitance (Cm) 101 may become smaller than a base mutual capacitance. This is because, when the conductive object like a finger approaches close to the touch sensor panel 100, the object functions as the ground GND, and then a fringing capacitance of the mutual capacitance (Cm) 101 is absorbed in the object. The base mutual capacitance is the value of the mutual capacitance between the drive electrode TX and the receiving electrode RX when there is no touch on the touch sensor panel 100.

When the object touches the top surface, i.e., the touch surface of the touch sensor panel 100 and a pressure is applied to the top surface, the touch sensor panel 100 may be bent. Here, the value of the mutual capacitance (Cm) 101 between the drive electrode TX and the receiving electrode RX may be more reduced. This is because the bend of the touch sensor panel 100 causes the distance between the touch sensor panel 100 and the reference potential layer to be reduced from "d" to "d'", so that the fringing capacitance of the mutual capacitance (Cm) 101 is absorbed in the reference potential layer as well as in the object. When a nonconductive object touches, the change of the mutual capacitance (Cm) 101 is simply caused by only the change of the distance "d-d'" between the touch sensor panel 100 and the reference potential layer.

As described above, the touch input device 1000 is configured to include the touch sensor panel 100 and the pressure detection module 400 on the display module 200, so that not only the touch position but also the touch pressure can be simultaneously detected.

However, as shown in FIG. 3, when the pressure detection module 400 as well as the touch sensor panel 100 is disposed on the display module 200, the display properties of the display module is deteriorated. Particularly, when the air gap 420 is included on the display module 200, the visibility and optical transmittance of the display module may be lowered.

Accordingly, in order to prevent such problems, the air gap is not disposed between the display module 200 and the touch sensor panel 100 for detecting the touch position. Instead, the touch sensor panel 100 and the display module 200 can be completely laminated by means of an adhesive like an optically clear adhesive (OCA).

Figure 4A:
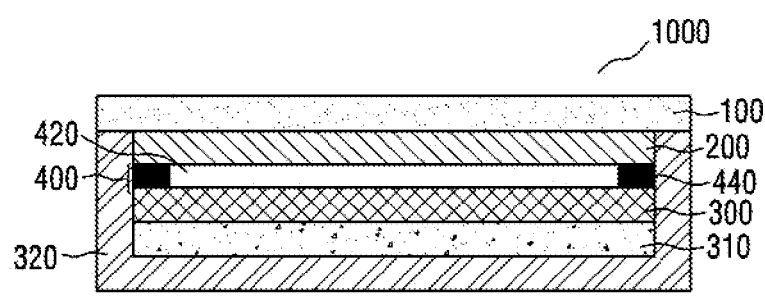
FIG. 4a is a cross sectional view of a touch input device according to the embodiment of the present invention.

FIG. 4a is a cross sectional view of a touch input device 1000 according to another embodiment of the present invention. In the touch input device 1000 according to the embodiment of the present invention, the complete lamination is made by an adhesive between the touch sensor panel 100 and the display module 200 for detecting the touch position. As a result, the display color clarity, visibility and optical transmittance of the display module 200, which can be recognized through the touch surface of the touch sensor panel 100, can be improved.

In FIGS. 4 to 7 and the description with reference to FIGS. 4 and 5, it is shown that as the touch input device 1000 according to the embodiment of the present invention, the touch sensor panel 100 is laminated and attached on the display module 200 by means of an adhesive. However, it can be considered that the touch sensor panel 100 is, as shown in FIGS. 2b and 2c, disposed inside the display module 200. More specifically, while FIGS. 4 to 7 show that the touch sensor panel 100 covers the display module 200, the touch input device 1000 which includes the touch sensor panel 100 disposed inside the display module 200 and includes the display module 200 covered with a cover layer like glass may be used as the embodiment of the present invention.

The touch input device 1000 according to the embodiment of the present invention may include an electronic device of the touch screen, for example, a cell phone, a personal data assistant (PDA), a smart phone, a tablet personal computer, an MP3 player, a laptop computer, etc.

In the touch input device 1000 according to the embodiment of the present invention, a substrate 300, together with an outermost cover 320 of the touch input device 1000, functions as, for example, a housing which surrounds a mounting space 310, etc., where the circuit board and/or battery for operation of the touch input device 1000 are placed. Here, the circuit board for operation of the touch input device 1000 may be a main board. A central processing unit (CPU), an application processor (AP) or the like may be mounted on the circuit board. Due to the substrate 300, the display module 200 is separated from the circuit board and/or battery for operation of the touch input device 1000. Due to the substrate 300, electrical noise generated from the display module 200 can be blocked.

The touch sensor panel 100 or front cover layer of the touch input device 1000 may be formed wider than the display module 200, the substrate 300, and the mounting space 310. As a result, the cover 320 is formed such that the cover 320, together with the touch sensor panel 100, surrounds the display module 200, the substrate 300, and the mounting space 310.

The touch input device 1000 according to the embodiment of the present may detect the touch position through the touch sensor panel 100 and may detect the touch pressure by disposing the pressure detection module 400 between the display module 200 and the substrate 300.

The pressure detection module 400 is formed to include, for example, the spacer layer 420 consisting of the air gap. This will be described in detail with reference to FIGS. 4b to 7b. The spacer layer 420 may be made of an impact absorbing material in accordance with the embodiment. The spacer layer 420 may be filled with a dielectric material in accordance with the embodiment.

Figure 4B:
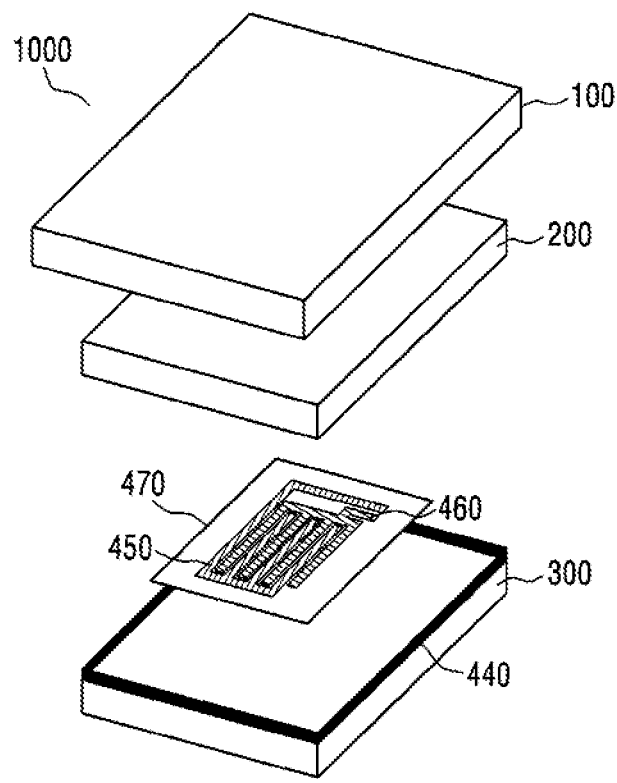
FIG. 4b is a perspective view of the touch input device according to the embodiment of the present invention.

FIG. 4b is a perspective view of the touch input device 1000 according to the embodiment of the present invention. As shown in FIG. 4b, in the touch input device 1000 according to the embodiment of the present, the pressure detection module 400 may include the spacer layer 420 which leaves a space between the display module 200 and the substrate 300 and may include electrodes 450 and 460 disposed within the spacer layer 420. Hereafter, for the purpose of clearly distinguishing the electrodes 450 and 460 from the electrode included in the touch sensor panel 100, the electrodes 450 and 460 for detecting the pressure are designated as pressure electrodes 450 and 460. Here, since the pressure electrodes 450 and 460 are included in the rear side instead of in the front side of the display panel, the pressure electrodes 450 and 460 may be made of an opaque material as well as a transparent material.

Here, the adhesive tape 440 with a predetermined thickness may be formed along the border of the upper portion of the substrate 300 in order to maintain the spacer layer 420. While FIG. 4b shows the adhesive tape 440 is formed on the entire border (e.g., four sides of the quadrangle) of the substrate 300, the adhesive tape 440 may be formed only on at least some (e.g., three sides of the quadrangle) of the border of the substrate 300. According to the embodiment, the adhesive tape 440 may be formed on the top surface of the substrate 300 or on the bottom surface of the display module 200. The adhesive tape 440 may be a conductive tape in order that the substrate 300 and the display module 200 have the same electric potential. The adhesive tape 440 may be a double adhesive tape. The adhesive tape 440 may be made of an inelastic material. In the embodiment of the present invention, when a pressure is applied to the display module 200, the display module 200 may be bent. Therefore, the magnitude of the touch pressure can be detected even though the adhesive tape 440 is not transformed by the pressure.

Figure 4C:
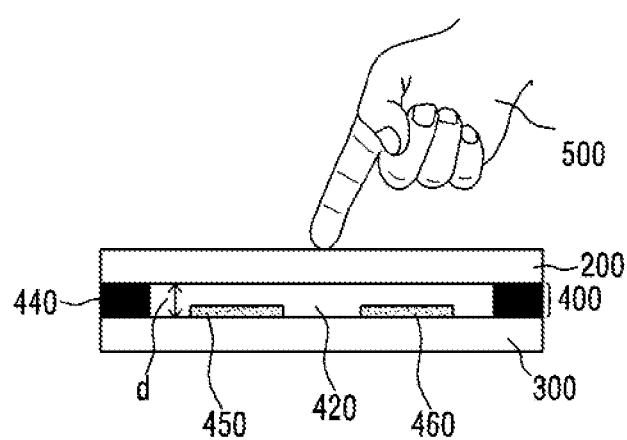
FIG. 4c is a cross sectional view of the touch input device including a pressure electrode pattern according to the embodiment of the present invention.

FIG. 4c is a cross sectional view of the touch input device including a pressure electrode pattern according to the embodiment of the present invention. As shown in FIG. 4c, in the touch input device 1000 according to the embodiment of the present invention, the pressure electrodes 450 and 460 may be formed within the spacer layer 420 and on the substrate 300.

The pressure electrode for detecting the pressure may include the first electrode 450 and the second electrode 460. Here, any one of the first and the second electrodes 450 and 460 may be a drive electrode and the other may be a receiving electrode. A driving signal is applied to the drive electrode, and a sensing signal may be obtained through the receiving electrode. When voltage is applied, the mutual capacitance may be generated between the first electrode 450 and the second electrode 460.

Figure 4D:
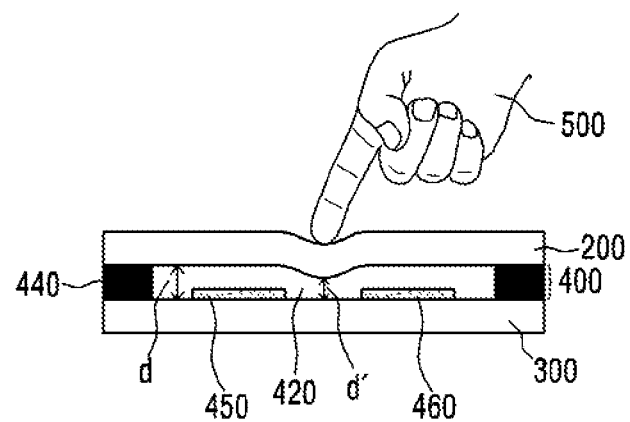

FIG. 4d is a cross sectional view showing a case where a pressure has been applied to the touch input device 1000 shown in FIG. 4c. The bottom surface of the display module 200 may have a ground potential so as to block the noise. When the pressure is applied to the surface of the touch sensor panel 100 by an object 500, the touch sensor panel 100 and the display module 200 may be bent. As a result, the distance "d" between the ground potential surface and the pressure electrode patterns 450 and 460 may be decreased to "d'". In this case, due to the decrease of the distance "d", the fringing capacitance is absorbed in the bottom surface of the display module 200, so that the mutual capacitance between the first electrode 450 and the second electrode 460 may be reduced. Therefore, the magnitude of the touch pressure can be calculated by obtaining the reduced amount of the mutual capacitance from the sensing signal obtained through the receiving electrode.

In the touch input device 1000 according to the embodiment of the present invention, the display module 200 may be bent or pressed by the touch pressure. The display module 200 may be bent or pressed in such a manner as to show the biggest transformation at the touch position. When the display module 200 is bent or pressed according to the embodiment, a position showing the biggest transformation may not match the touch position. The display module 200 may be shown to be bent or pressed at least at the touch position. For example, when the touch position approaches close to the border, edge, etc., of the display module 200, the most bent or pressed position of the display module 200 may not match the touch position, however, the display module 200 may be shown to be bent or pressed at least at the touch position.

Figure 8:
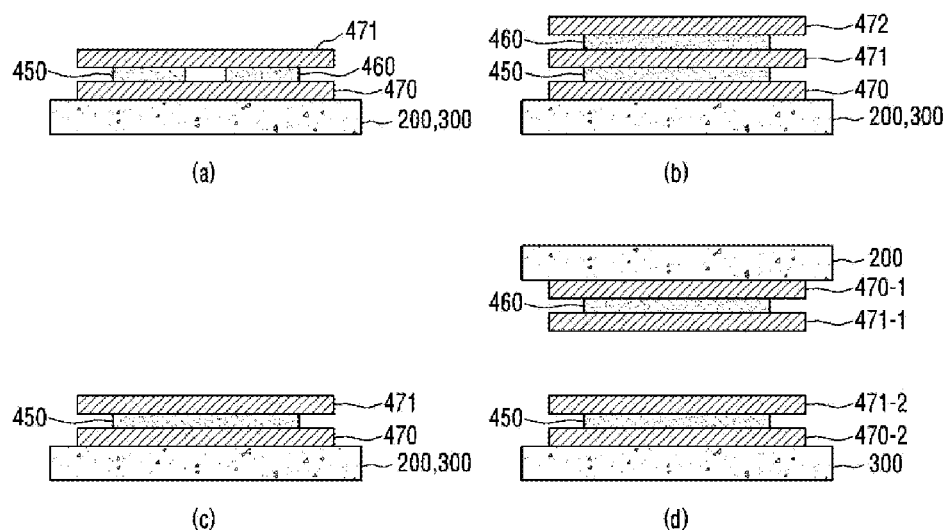
FIG. 8 shows an attachment structure of the pressure electrode according the embodiment of the present invention.
Figure 9:
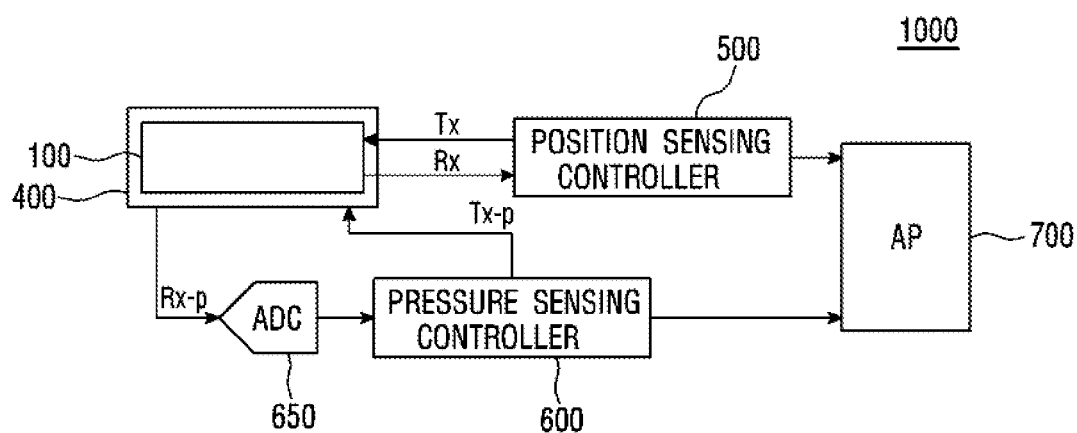
FIGS. 9 to 14 are block diagrams showing the configurations of the touch input devices according to the first to sixth embodiments of the present invention.

Here, the top surface of the substrate 300 may also have the ground potential in order to block the noise. Therefore, in order to prevent a short-circuit from occurring between the substrate 300 and the pressure electrodes 450 and 460, the pressure electrodes 450 and 460 may be formed on an insulation layer 470. FIG. 8 shows an attachment structure of the pressure electrode according the embodiment of the present invention. Referring to (a) of FIG. 8, the first insulation layer 470 is positioned on the substrate 300, and then the pressure electrodes 450 and 460 are formed. Also, according to the embodiment, the first insulation layer 470 on which the pressure electrodes 450 and 460 have been formed may be attached on the substrate 300. Also, the pressure electrode according to the embodiment may be formed by positioning a mask, which has a through-hole corresponding to the pressure electrode pattern, on the substrate 300 or on the first insulation layer 470 positioned on the substrate 300, and then by spraying a conductive material.

Also, when the bottom surface of the display module 200 has the ground potential, the pressure electrodes 450 and 460 may be covered with an additional second insulation layer 471 in order to prevent a short-circuit from occurring between the display module 200 and the pressure electrode 450 and 460 positioned on the substrate 300. Also, the pressure electrodes 450 and 460 formed on the first insulation layer 470 are covered with the additional second insulation layer 471 and then are integrally attached on the substrate 300, so that the pressure detection module 400 is formed.

The pressure electrode 450 and 460 attachment structure and method, which have been described with reference to (a) of FIG. 8, may be applied to the attachment of the pressure electrodes 450 and 460 to the display module 200. The attachment of the pressure electrodes 450 and 460 to the display module 200 will be described in more detail with reference to FIG. 4e.

Also, depending on the kind and/or implementation method of the touch input device 1000, the substrate 300 or the display module 200 on which the pressure electrodes 450 and 460 are attached may not have the ground potential or may have a weak ground potential. In this case, the touch input device 1000 according to the embodiment of the present may further include a ground electrode (not shown) between the first insulation layer 470 and either the substrate 300 or the display module 200. According to the embodiment, another insulation layer (not shown) may be included between the ground electrode and either the substrate 300 or the display module 200. Here, the ground electrode (not shown) is able to prevent the size of the capacitance generated between the first electrode 450 and the second electrode 460, which are pressure electrodes, from increasing excessively.

The above-described method for forming and attaching pressure electrode 450 and 460 can be applied in the same manner to the following embodiments.

Figure 4E:
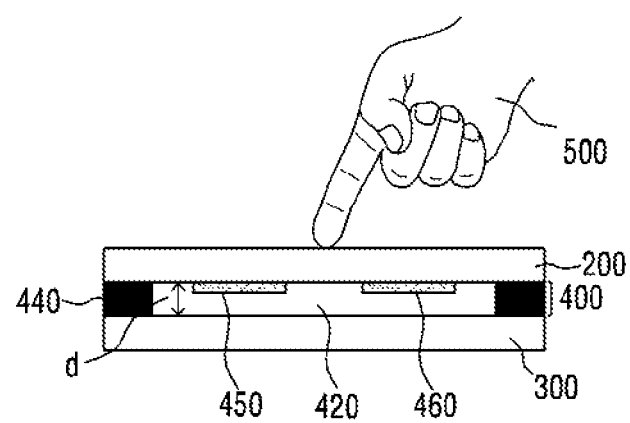
FIG. 4e is a cross sectional view of the touch input device including a pressure electrode according to the embodiment of the present invention.

FIG. 4e is a cross sectional view of the touch input device including a pressure electrode pattern according to the embodiment of the present invention. While it is shown herein that the pressure electrodes 450 and 460 are formed on the substrate 300, the pressure electrodes 450 and 460 can be formed on the bottom surface of the display module 200. Here, the substrate 300 may have the ground potential. Therefore, the distance "d" between the substrate 300 and the pressure electrodes 450 and 460 is reduced by touching the touch surface of the touch sensor panel 100. Consequently, this may cause the change of the mutual capacitance between the first electrode 450 and the second electrode 460.

Figure 4F:
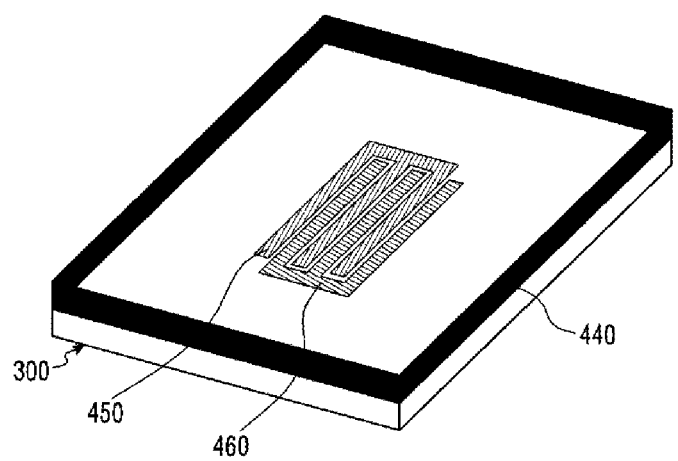
FIG. 4f shows the pressure electrode pattern according to the embodiment of the present invention.

FIG. 4f shows the pressure electrode pattern. FIG. 4f shows that the first electrode 450 and the second electrode 460 are formed on the substrate 300. The capacitance between the first electrode 450 and the second electrode 460 may be changed depending on the distance between the bottom surface of the display module 200 and the pressure electrode patterns 450 and 460.

Figure 4G:
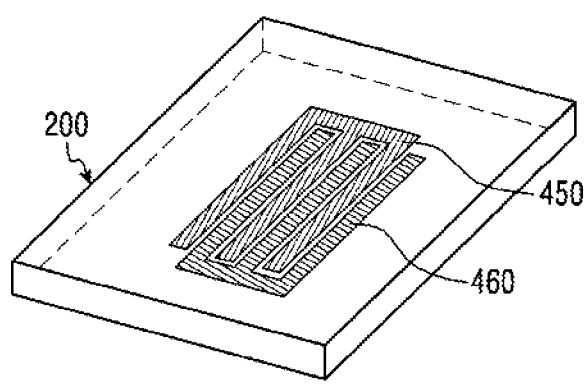
FIG. 4g shows the pressure electrode pattern according to the embodiment of the present invention.

FIG. 4g shows another pressure electrode pattern. FIG. 4g shows that the pressure electrode patterns 450 and 460 have been formed on the bottom surface of the display module 200.

Figure 4H:
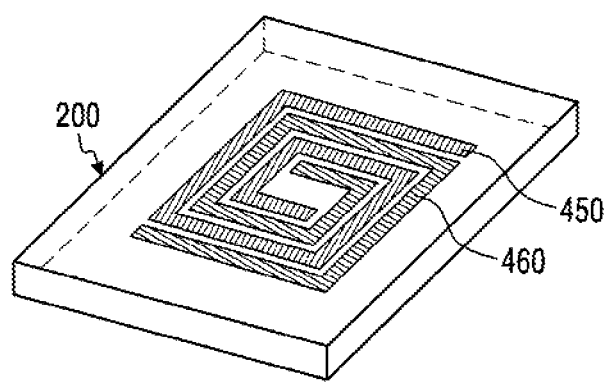
FIGS. 4h to 4i show pressure electrode patterns which can be applied to the embodiment of the present invention.
Figure 4I:
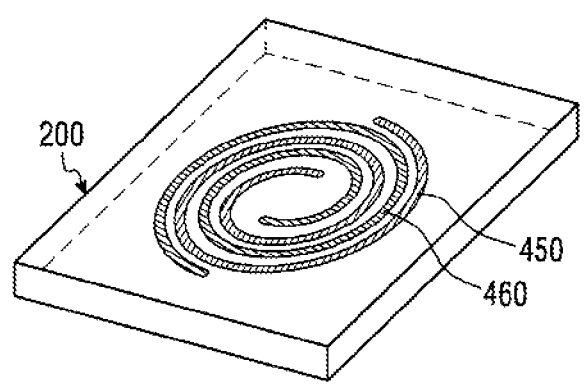

FIGS. 4h to 4i show pressure electrode patterns 450 and 460 which can be applied to the present invention. When the magnitude of the touch pressure is detected as the mutual capacitance between the first electrode 450 and the second electrode 460 is changed, it is necessary to form the patterns of the first electrode 450 and the second electrode 460 so as to generate the range of the capacitance required to improve the detection accuracy. With the increase of a facing area or facing length of the first electrode 450 and the second electrode 460, the size of the capacitance that is generated may become larger. Therefore, the pattern can be designed by adjusting the size of the facing area, facing length and facing shape of the first electrode 450 and the second electrode 460 in accordance with the range of the necessary capacitance. FIGS. 4h and 4i show that the first electrode 450 and the second electrode 460 are formed in the same layer, and show that the pressure electrode is formed such that the facing length of the first electrode 450 and the second electrode 460 becomes relatively longer.

In the foregoing description, it is shown that the first electrode 450 and the second electrode 460 are formed in the same layer. However, it can be considered that the first electrode 450 and the second electrode 460 are formed in different layers in accordance with the embodiment. It is shown in (b) of FIG. 8 that an attachment structure in which the first electrode 450 and the second electrode 460 are formed in different layers. As shown in (b) of FIG. 8, the first electrode 450 may be formed on the first insulation layer 470, and the second electrode 460 may be formed on the second insulation layer 471 positioned on the first electrode 450. According to the embodiment, the second electrode 460 may be covered with a third insulation layer 472. Here, since the first electrode 450 and the second electrode 460 are disposed in different layers, they can be implemented so as to overlap each other. For example, the first electrode 450 and the second electrode 460 may be formed similarly to the pattern of the drive electrode TX and receiving electrode RX which are arranged in the form of M×N array and are included in the touch sensor panel 100 described with reference to FIG. 1. Here, M and N may be natural numbers greater than 1.

In the touch input device 1000 according to the embodiment of the present invention, it has been described that the touch pressure is detected from the change of the mutual capacitance between the first electrode 450 and the second electrode 460. However, the pressure electrodes 450 and 460 may be configured to include only any one of the first electrode 450 and the second electrode 460. In this case, it is possible to detect the magnitude of the touch pressure by detecting the change of the capacitance between the one pressure electrode and the ground layer (either the display module 200 or the substrate 300).

For instance, in FIG. 4c, the pressure electrode may be configured to include only the first electrode 450. Here, the magnitude of the touch pressure can be detected by the change of the capacitance between the first electrode 450 and the display module 200, which is caused by the distance change between the display module 200 and the first electrode 450. Since the distance "d" is reduced with the increase of the touch pressure, the capacitance between the display module 200 and the first electrode 450 may be increased with the increase of the touch pressure. This can be applied in the same manner to the embodiment related to FIG. 4e. Here, the pressure electrode should not necessary have a comb teeth shape or a trident shape, which is required to improve the detection accuracy of the mutual capacitance change amount. The pressure electrode may have, as shown in FIG. 5b, a plate shape (e.g., quadrangular plate).

It is shown in (c) of FIG. 8c that an attachment structure in which the pressure electrode is formed to include only the first electrode 450. As shown in (c) of FIG. 8, the first electrode 450 may be formed on the first insulation layer 470 positioned on the substrate 300 or display module 200. Also, according to the embodiment, the first electrode 450 may be covered with the second insulation layer 471.

Figure 5A:
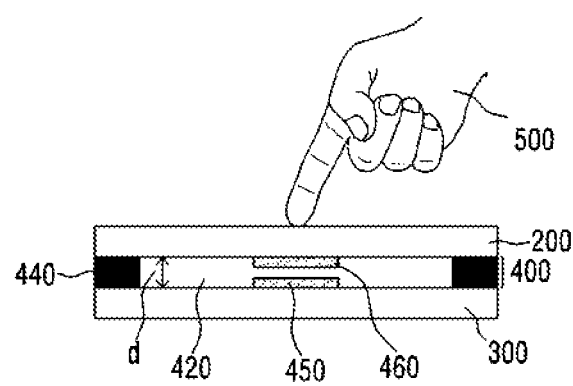
FIG. 5a is a cross sectional view of the touch input device including the pressure electrode according to the embodiment of the present invention.
Figure 5B:
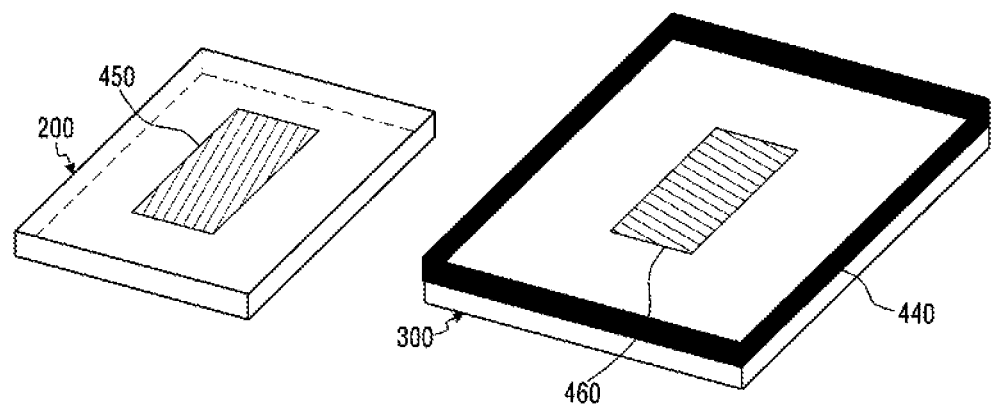
FIG. 5b shows the pressure electrode pattern according to the embodiment of the present invention.

FIG. 5a is a cross sectional view of the touch input device including the pressure electrode according to the embodiment of the present invention. The pressure electrodes 450 and 460 according to the embodiment may be formed within the spacer layer 420 and on the top surface of the substrate 300 and on the bottom surface of the display module 200.

The pressure electrode pattern for detecting the pressure may include the first electrode 450 and the second electrode 460. Here, any one of the first electrode 450 and the second electrode 460 may be formed on the substrate 300, and the other may be formed on the bottom surface of the display module 200. FIG. 5a shows that the first electrode 450 is formed on the substrate 300, and the second electrode 460 is formed on the bottom surface of the display module 200.

When the pressure is applied to the surface of the touch sensor panel 100 by the object 500, the touch sensor panel 100 and the display module 200 may be bent. As a result, the distance "d" between the first electrode 450 and the second electrode 460 may be reduced. In this case, the mutual capacitance between the first electrode 450 and the second electrode 460 may be increased with the reduction of the distance "d". Therefore, the magnitude of the touch pressure can be calculated by obtaining the increase amount of the mutual capacitance from the sensing signal obtained through the receiving electrode.

FIG. 5b shows the pressure electrode pattern according to another embodiment of the present invention. FIG. 5b shows that the first electrode 450 is formed on the top surface of the substrate 300 and the second electrode 460 is formed on the bottom surface of the display module 200. As shown in FIG. 5b, since the pressure electrodes 450 and 460 are formed in different layers, the pressure electrodes 450 and 460 should not necessarily have a comb teeth shape or a trident shape unlike the embodiment. The pressure electrodes 450 and 460 may have a plate shape (e.g., quadrangular plate).

It is shown in (d) of FIG. 8 that an attachment structure in which the first electrode 450 is attached on the substrate 300 and the second electrode 460 is attached to the display module 200. As shown in (d) of FIG. 8, the first electrode 450 may be positioned on the first insulation layer 470-2 formed on the substrate 300 and may be covered with the second insulation layer 471-2. Also, the second electrode 460 may be positioned on the first insulation layer 470-1 formed on the bottom surface of the display module 200 and may be covered with the second insulation layer 471-1.

As with the description related to (a) of FIG. 8, when substrate 300 or the display module 200 on which the pressure electrodes 450 and 460 are attached may not have the ground potential or may have a weak ground potential, a ground electrode (not shown) may be further included between the first insulation layers 470, 470-1, and 470-2 in (a) to (d) of FIG. 8. Here, an additional insulation layer (not shown) may be further included between the ground electrode (not shown) and either the substrate 300 or the display module 200 on which the pressure electrodes 450 and 460 are attached.

As described above, the touch input device 1000 according to the embodiment of the present invention senses the capacitance change occurring in the pressure electrodes 450 and 460. Therefore, it is necessary for the driving signal to be applied to the drive electrode out of the first and second electrodes 450 and 460, and it is required to detect the touch pressure by the capacitance change amount by obtaining the sensing signal from the receiving electrode. According to the embodiment, it is possible to additionally include the touch sensing IC for the operation of the pressure detection module 400.

Hereafter, the touch input device 1000 according to another embodiment will be described and the following description will focus on the differences from FIGS. 4a to 5b will be mainly described. In the touch input device 1000 according to another embodiment of the present invention, the touch pressure can be detected by using the air gap and/or potential layer which are positioned inside or outside the display module 200 without manufacturing a separate spacer layer and/or reference potential layer. This will be described in detail with reference to FIGS. 6a to 7b.

Figure 6A:
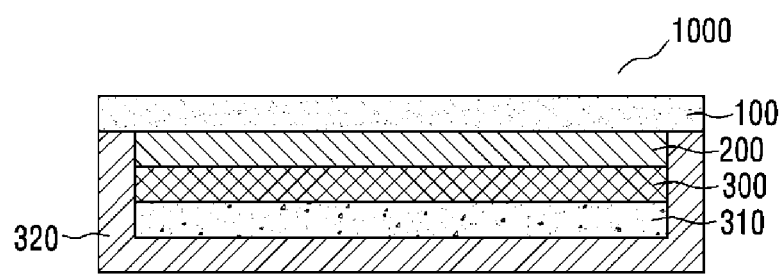
FIG. 6a is a cross sectional view of a touch input device according to another embodiment of the present invention.
Figure 6B:
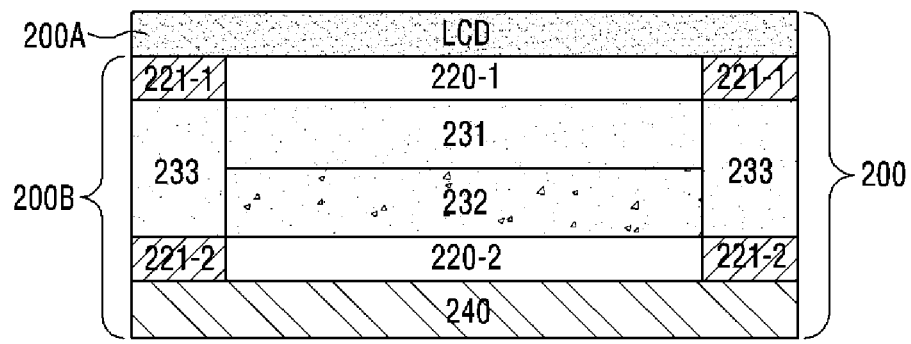
FIG. 6b is an exemplary cross sectional view of a display module which can be included in the touch input device according to the embodiment of the present invention.

FIG. 6a is a cross sectional view of a touch input device according to another embodiment of the present invention. FIG. 6b is an exemplary cross sectional view of the display module 200 which can be included in the touch input device 1000 according to the embodiment of the present invention.

FIG. 6b is an exemplary cross sectional view of the display module 200 which can be included in the touch input device 1000 according to the second embodiment of the present invention. FIG. 6b shows an LCD module as the display module 200. As shown in FIG. 4b, the LCD module 200 may include an LCD panel 200A and a backlight unit 200B. The LCD panel 200A cannot emit light in itself but simply performs a function to block or transmit the light. Therefore, a light source is positioned in the lower portion of the LCD panel 200A and light is illuminated onto the LCD panel 200A, so that a screen displays not only brightness and darkness but information with various colors. Since the LCD panel 200A is a passive device and cannot emit the light in itself, a light source having a uniform luminance distribution is required on the rear side. The structures and functions of the LCD panel 200A and the backlight unit 200B have been already known to the public and will be briefly described below.

The backlight unit 200B for the LCD panel 200A may include several optical parts. In FIG. 6b, the backlight unit 200B may include a light diffusing and light enhancing sheet 231, a light guide plate 232, and a reflection plate 240. Here, the backlight unit 200B may include a light source (not shown) which is formed in the form of a linear light source or point light source and is disposed on the rear and/or side of the light guide plate 232. According to the embodiment, a support 233 may be further included on the edges of the light guide plate 232 and the light diffusing and light enhancing sheet 231.

The light guide plate 232 may generally convert lights from the light source (not shown) in the form of a linear light source or point light source into light from a light source in the form of a surface light source, and allow the light to proceed to the LCD panel 200A.

A part of the light emitted from the light guide plate 232 may be emitted to a side opposite to the LCD panel 200A and be lost. The reflection plate 240 may be positioned below the light guide plate 232 so as to cause the lost light to be incident again on the light guide plate 232, and may be made of a material having a high reflectance.

The light diffusing and light enhancing sheet 231 may include a diffuser sheet and/or a prism sheet. The diffuser sheet functions to diffuse the light incident from the light guide plate 232. For example, light scattered by the pattern of the light guide plate 232 comes directly into the eyes of the user, and thus, the pattern of the light guide plate 232 may be shown as it is. Moreover, since such a pattern can be clearly sensed even after the LCD panel 200A is mounted, the diffuser sheet is able to perform a function to offset the pattern of the light guide plate 232.

After the light passes through the diffuser sheet, the luminance of the light is rapidly reduced. Therefore, the prism sheet may be included in order to improve the luminance of the light by focusing the light again.

The backlight unit 200B may include a configuration different from the above-described configuration in accordance with the technical change and development and/or the embodiment. The backlight unit 200B may further include an additional configuration as well as the foregoing configuration. Also, in order to protect the optical configuration of the backlight unit 200B from external impacts and contamination, etc., due to the introduction of the alien substance, the backlight unit 200B according to the embodiment of the present may further include, for example, a protection sheet on the prism sheet. The backlight unit 200B may also further include a lamp cover in accordance with the embodiment so as to minimize the optical loss of the light source. The backlight unit 200B may also further include a frame which maintains a shape enabling the light diffusing and light enhancing sheet 231, the light guide plate 232, a lamp (not shown), and the like, which are main components of the backlight unit 200B, to be exactly combined together in accordance with an allowed dimension. Also, the each of the components may be comprised of at least two separate parts. For example, the prism sheet may include two prism sheets.

Here, a first air gap 220-2 may be positioned between the light guide plate 232 and the reflection plate 240. As a result, the lost light from the light guide plate 232 to the reflection plate 240 can be incident again on the light guide plate 232 by the reflection plate 240. Here, between the light guide plate 232 and the reflection plate 240, for the purpose of maintaining the air gap 220-2, a double adhesive tape 221-2 may be included on the edges of the light guide plate 232 and the reflection plate 240.

Also, according to the embodiment, the backlight unit 200B and the LCD panel 200A may be positioned with the second air gap 220-1 placed therebetween. This intends to prevent that the impact from the LCD panel 200A is transmitted to the backlight unit 200B. Here, between the backlight unit 200B and the LCD panel 200A, a double adhesive tape 221-1 may be included on the edges of the LCD panel 200A and the backlight unit 200B.

As described above, the display module 200 may be configured to include in itself the air gap such as the first air gap 220-2 and/or the second air gap 220-1. Also, the air gap may be included between a plurality of the layers of the light diffusing and light enhancing sheet 231. In the foregoing, while the LCD module has been described, the air gap may be included within the structure of another display module.

Therefore, for detecting the touch pressure, the touch input device 1000 according to the second embodiment of the present invention may make use of the air gap which has been already positioned inside or outside the display module 200 without manufacturing a separate spacer layer. The air gap which is used as the spacer layer may be not only the first air gap 220-2 and/or the second air gap 220-1 which are described with reference to FIG. 4b but also any air gap included inside the display module 200. Also, the air gap which is used as the spacer layer may be an air gap included outside the display module 200. As such, the manufacture of the touch input device 1000 capable of detecting the touch pressure reduces manufacturing cost and/or simplifies the manufacturing process.

Figure 7A:
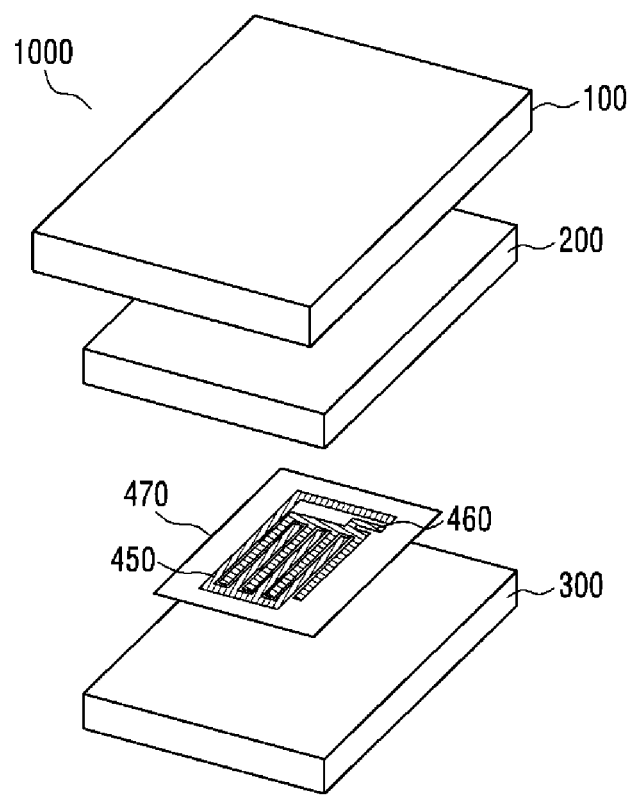
FIG. 7a is a perspective view of the touch input device according to the embodiment of the present invention.

FIG. 7a is a perspective view of the touch input device according to the embodiment of the present invention. Unlike the touch input device 1000 shown in FIGS. 4a and 4b, the touch input device 1000 shown in FIGS. 6a and 7a may not include the adhesive tape 440 for maintaining the air gap 420.

Figure 7B:
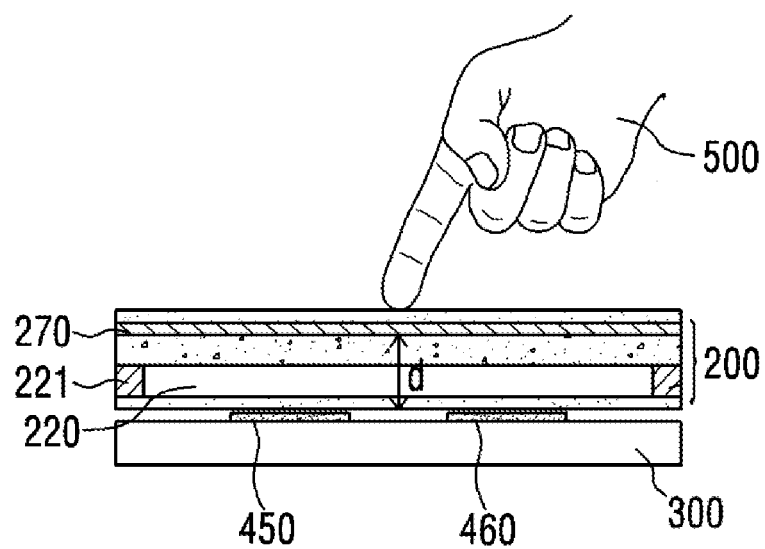
FIG. 7b is a cross sectional view of the touch input device including the pressure electrode pattern according to the embodiment of the present invention.
Figure 7C:
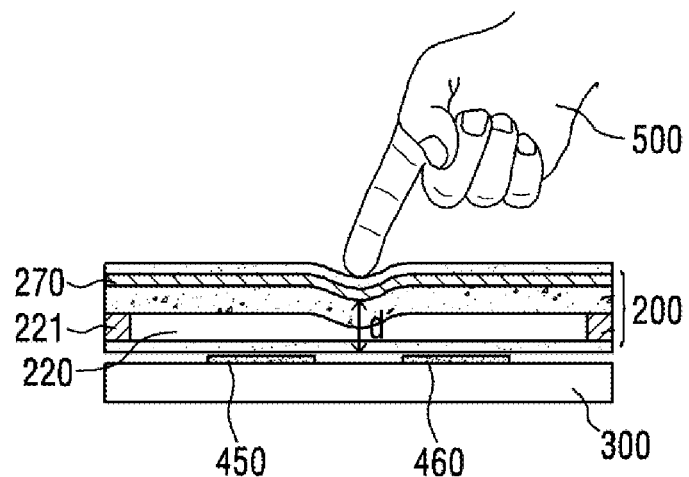
FIG. 7c is a cross sectional view showing that a pressure has been applied to the touch input device shown in FIG. 7b.

FIG. 7b is a cross sectional view of the touch input device including the pressure electrode pattern according to the embodiment of the present invention. As shown in FIG. 7b, between the display module 200 and the substrate 300, the pressure electrodes 450 and 460 may be formed on the substrate 300. In FIGS. 7b to 7g, the pressure electrodes 450 and 460 are shown exaggeratedly thick for convenience of description. However, since the pressure electrodes 450 and 460 can be implemented in the form of a sheet, the thickness of the first electrode 450 and the second electrode 460 may be very small. Likewise, although the distance between the display module 200 and the substrate 300 is also shown exaggeratedly large, the display module 200 and the substrate 300 may be implemented to have a very small distance therebetween. FIGS. 7b and 7c show that the display module 200 and the pressure electrodes 450 and 460 are spaced apart from each other so as to represent that the first electrode 450 and the second electrode 460 have been formed on the substrate 300. However, this is for description only. The display module 200 and the first and second electrodes 450 and 460 may not be spaced apart from each other.

Here, FIG. 7b shows that the display module 200 includes a spacer layer 220 and a reference potential layer 270. The spacer layer 220 may be, as described with reference to FIG. 6b, the first air gap 220-2 and/or the second air gap 220-1 which are included during the manufacture of the display module 200. When the display module 200 includes one air gap, the air gap may function as the spacer layer 220. When the display module 200 includes a plurality of air gaps, the plurality of air gaps may collectively function as the spacer layer 220. FIGS. 7b, 7c, 7f and 7g show that the display module 200 functionally includes one spacer layer 220.

According to the embodiment of the present invention, the touch input device 1000 may include the reference potential layer 270 which is positioned above the spacer layer 220 within the display module 200 of FIGS. 2a to 2c. The reference potential layer 270 may be a ground potential layer which is included in itself during the manufacture of the display module 200. For example, in the display panel 200A shown in FIGS. 2a to 2c, an electrode (not shown) for blocking the noise may be included between the first polarizer layer 271 and the first glass layer 261. The electrode for blocking the noise may be composed of ITO and may function as the ground. Within the display module 200, the reference potential layer 270 may be located at any position causing the spacer layer 220 to be placed between the reference potential layer 270 and the pressure electrodes 450 and 460. Not only the above-described shielding electrode but also an electrode having any potential may be used as the reference potential layer 270. For example, the reference potential layer 270 may be a common electrode potential (Vcom) layer of the display module 200.

Particularly, as part of an effort to reduce the thickness of the device including the touch input device 1000, the display module 200 may not be surrounded by a separate cover or frame. In this case, the bottom surface of the display module 200, which faces the substrate 300, may be the reflection plate 240 and/or a nonconductor. In this case, the bottom surface of the display module 200 cannot have the ground potential. As mentioned, even when the bottom surface of the display module 200 cannot function as the reference potential layer, it is possible to detect the touch pressure by using any potential layer positioned within the display module 200 as the reference potential layer 270 through use of the touch input device 1000 according to the embodiment of the present invention.

FIG. 7c is a cross sectional view showing that a pressure has been applied to the touch input device 1000 shown in FIG. 7b. When the pressure is applied to the surface of the touch sensor panel 100 by the object 500, the touch sensor panel 100 or the display module 200 may be bent or pressed. Here, the distance "d" between the reference potential layer 270 and the pressure electrode patterns 450 and 460 may be decreased to "d'" by the spacer layer 220 positioned within the display module 200. In this case, due to the decrease of the distance "d", the fringing capacitance is absorbed in the reference potential layer 270, so that the mutual capacitance between the first electrode 450 and the second electrode 460 may be reduced. Therefore, the magnitude of the touch pressure can be calculated by obtaining the reduced amount of the mutual capacitance from the sensing signal obtained through the receiving electrode.

Here, when the magnitude of the touch pressure is sufficiently large, a state may be created in which the distance between the reference potential layer 270 and the pressure electrode patterns 450 and 460 is not reduced any more at a predetermined position. Hereafter, this state will be referred to as a saturation state. However, even in this case, when the magnitude of the touch pressure becomes larger, an area in the saturation state where the distance between the reference potential layer 270 and the pressure electrode patterns 450 and 460 is not reduced any more may become greater. The greater the area is, the more the mutual capacitance between the first electrode 450 and the second electrode 460 may be reduced. Hereafter, it will be described that the magnitude of the touch pressure is calculated by the change of the capacitance according to the distance change. However, this may include that the magnitude of the touch pressure is calculated by the change of the area in the saturation state.

Here, when the display module 200 is bent or pressed at the time of touching the touch input device 1000, the layer positioned below the spacer layer 220 (e.g., the reflection plate), as shown in FIG. 7c, may not be bent or pressed or may be less bent or pressed due to the spacer layer 220. While FIG. 7c shows that the lowest portion of the display module 200 is not bent or pressed at all, this is just an example. The lowest portion of the display module 200 may be bent or pressed. However, the degree to which the lowest portion of the display module 200 is bent or pressed can be reduced by the spacer layer 220.

Figure 7D:
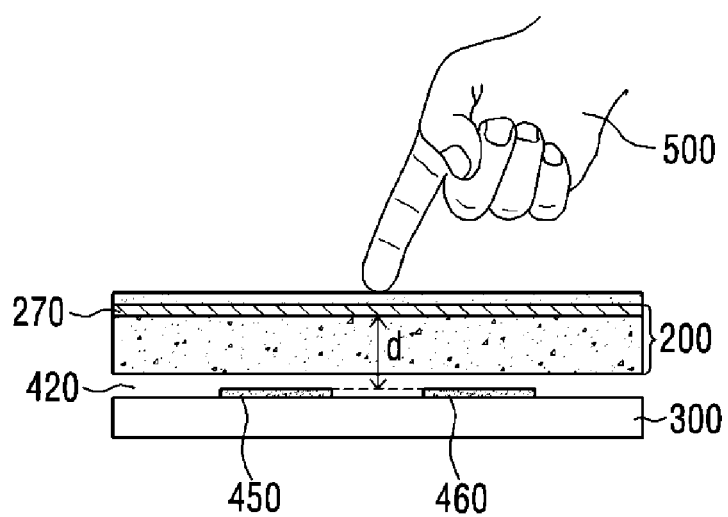
FIG. 7d is a cross sectional view of the touch input device including the pressure electrode pattern according to the modification of the embodiment of the present invention
Figure 7E:
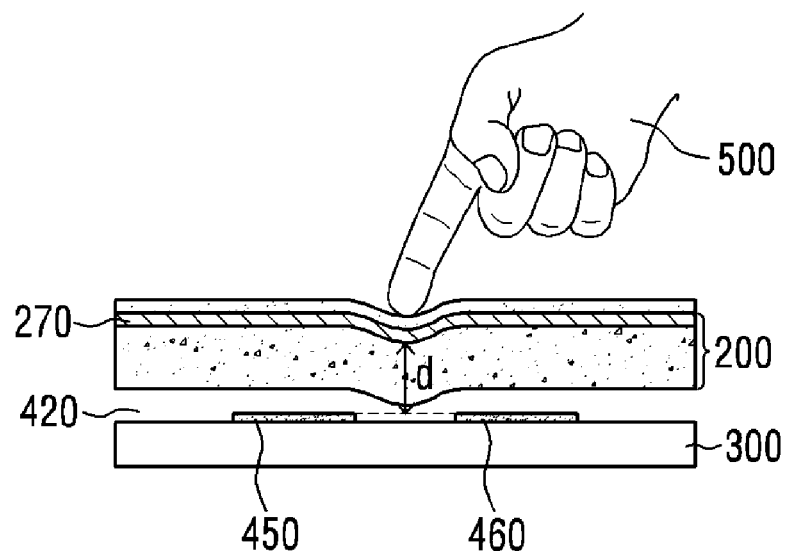
FIG. 7e is a cross sectional view showing that a pressure has been applied to the touch input device shown in FIG. 7d.

FIG. 7d is a cross sectional view of the touch input device including the pressure electrode pattern according to a modified example of the embodiment of the present invention. FIG. 7d shows that the spacer layer 220 is positioned between the display module 200 and the substrate 300. When the touch input device 1000 including the display module 200 is manufactured, the display module 200 is not completely attached to the substrate 300, so that the air gap 420 may be created. Here, by using the air gap 420 as the spacer layer for detecting the touch pressure, it is possible to reduce the time and cost intentionally required for manufacturing the spacer layer for detecting the touch pressure. FIGS. 7d and 7e show that the air gap 420 used as the spacer layer is not positioned within the display module 200. However, FIGS. 7d and 7e may additionally include a case where the air gap 420 is positioned within the display module 200.

FIG. 7e is a cross sectional view of a case where a pressure has been applied to the touch input device shown in FIG. 7d. As with FIG. 7c, when the touch occurs on the touch input device 1000, the display module 200 may be bent or pressed. Here, the "d" between the reference potential layer 270 and the pressure electrode patterns 450 and 460 may be decreased to "d'" by the spacer layer 220 which are positioned between the reference potential layer 270 and the pressure electrodes 450 and 460. In this case, a fringing capacitance is absorbed into the reference potential layer 270 due to the decrease of the distance "d", so that the mutual capacitance between the first electrode 450 and the second electrode 460 may be reduced. As a result, the magnitude of the touch pressure can be calculated by obtaining the reduced amount of the mutual capacitance from the sensing signal obtained through the receiving electrode.

Figure 7F:
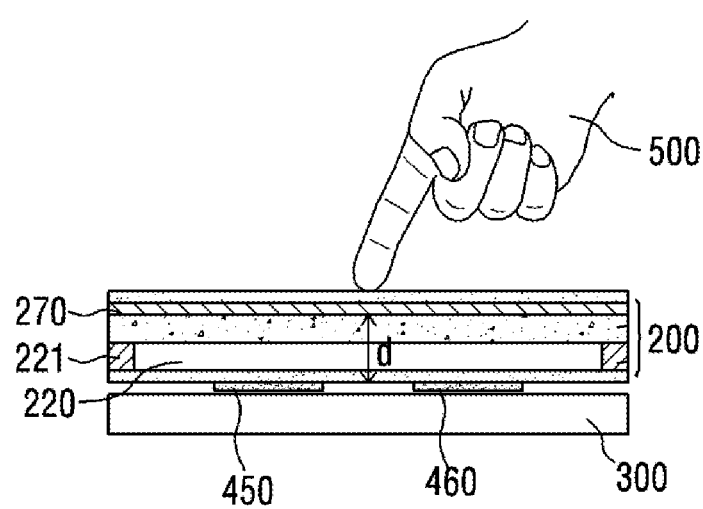
FIG. 7f is a cross sectional view of the touch input device including the pressure electrode according to the embodiment of the present invention.

FIG. 7f is a cross sectional view of the touch input device including a pressure electrode pattern according to the embodiment of the present invention. While it is shown in FIGS. 7b to 7e that the pressure electrodes 450 and 460 are formed on the substrate 300, the pressure electrodes 450 and 460 can be formed on the bottom surface of the display module 200. The distance "d" between the reference potential layer 270 and the pressure electrodes 450 and 460 is reduced by touching the touch surface of the touch sensor panel 100. Consequently, this may cause the change of the mutual capacitance between the first electrode 450 and the second electrode 460. FIG. 7f shows that the substrate 300 and the pressure electrodes 450 and 460 are spaced apart from each other so as to describe that the pressure electrodes 450 and 460 are attached on the display module 200. However, this is for description only. The substrate 300 and the pressure electrodes 450 and 460 may not be spaced apart from each other. Also, as with FIGS. 7d and 7e, the display module 200 and the substrate 300 may be spaced apart from each other by the air gap 420.

Figure 7G:
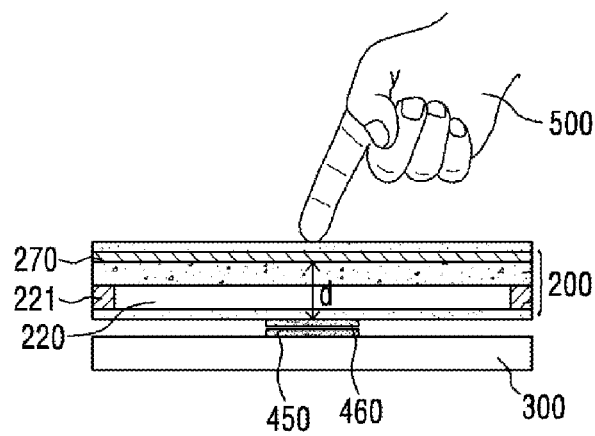
FIG. 7g is a cross sectional view of the touch input device including the pressure electrode according to the embodiment of the present invention.

FIG. 7g is a cross sectional view of the touch input device including the pressure electrode according to the embodiment of the present invention. The pressure electrodes 450 and 460 according to the embodiment of the present invention may be formed on the top surface of the substrate 300 and on the bottom surface of the display module 200.

The pressure electrode pattern for detecting the pressure may include the first electrode 450 and the second electrode 460. Here, any one of the first electrode 450 and the second electrode 460 may be formed on the substrate 300, and the other may be formed on the bottom surface of the display module 200. FIG. 7g shows that the first electrode 450 is formed on the substrate 300, and the second electrode 460 is formed on the bottom surface of the display module 200. FIG. 7g shows that the first electrode 450 is spaced apart from the second electrode 460. However, this is just intended to describe that the first electrode 450 is formed on the substrate 300 and the second electrode 460 is formed on the display module 200. The first electrode 450 and the second electrode 460 may be spaced apart from each other by the air gap, may have an insulating material placed therebetween, or may be formed to deviate from each other, for example, may be formed in the same layer, not to be overlapped with each other.

When the pressure is applied to the surface of the touch sensor panel 100 by the object 500, the touch sensor panel 100 and the display module 200 may be bent or pressed. As a result, the distance "d" between the reference potential layer 270 and the first and second electrodes 450 and 460 may be reduced. In this case, the mutual capacitance between the first electrode 450 and the second electrode 460 may be decreased with the reduction of the distance "d". Therefore, the magnitude of the touch pressure can be calculated by obtaining the reduced amount of the mutual capacitance from the sensing signal obtained through the receiving electrode.

Figure 7H:
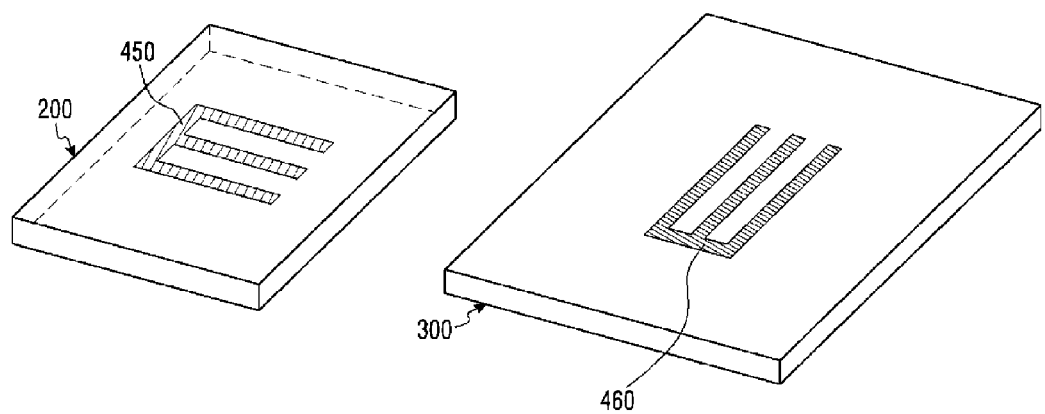
FIG. 7h shows the pressure electrode pattern according to the embodiment of the present invention.

FIG. 7h shows the pressure electrode pattern according to the third embodiment of the present invention. FIG. 7h shows that the first electrode 450 is formed on the top surface of the substrate 300 and the second electrode 460 is formed on the bottom surface of the display module 200. As shown in FIG. 7h, the first electrode 450 and the second electrode 460 are disposed perpendicular to each other, so that the capacitance change amount detection sensitivity can be enhanced.

Hereafter, various embodiments of the configuration of the touch input device 1000 according to the embodiment of the present invention will be described with reference to FIGS. 9 to 14.

First Embodiment

The touch input device 1000 according to a first embodiment includes the touch sensor panel 100, a pressure detection module 400, a position sensing controller 500, a pressure sensing controller 600, a converter 650 and a processor 700.

According to the first embodiment, in the touch input device 1000, the position sensing controller 500 which senses the touch position from the touch sensor panel 100 is implemented separately from the converter 650 and the pressure sensing controller 600.

That is, the touch position detection from the touch sensor panel 100 and the touch pressure detection from the pressure detection module 400 are performed by separate components, i.e., the position sensing controller 500 and the pressure sensing controller 600 respectively.

Meanwhile, the separately provided converter 650 is an analog-to-digital converter (ADC) which converts a sensing signal Rx received from the pressure detection module 400 into a digital signal. The signal converted by the converter 650 is transmitted to the pressure sensing controller 600. The pressure sensing controller 600 detects the touch pressure on the basis of the digital signal.

In the first embodiment, since a method for detecting the touch position from the touch sensor panel 100 and the touch pressure from the pressure detection module 400 has been described in detail with reference to FIGS. 1 to 8, the method will be described herein in brief.

The position sensing controller 500 applies a driving signal Tx to the drive electrode of the touch sensor panel 100 and obtains the sensing signal Rx from the receiving electrode. Here, the sensing signal Rx may be a signal coupled by the capacitance generated between the receiving electrode and the drive electrode of the touch sensor panel 100, to which the driving signal Tx has been applied. A converter for converting the sensing signal Rx into a digital signal may be included within the position sensing controller 500.

Also, the position sensing controller 500 may further include at least one integrator (not shown). The sensing signal Rx may be integrated by the integrator and may be converted into a digital signal by the converter provided within the position sensing controller 500.

The pressure sensing controller 600 applies a driving signal Tx-p to the drive electrode within the pressure detection module 400 and obtains the reduced amount of the mutual capacitance from a sensing signal Rx-p obtained through the receiving electrode, and then senses the touch pressure. Here, in the touch input device 1000 according to the first embodiment of the present invention, the pressure sensing controller 600 is provided separately from the converter 650. As described above, based on the sensing signal Rx-p which has been converted into a digital signal by the converter 650, the pressure sensing controller 600 generates touch pressure data.

Meanwhile, the touch position data detected by the position sensing controller 500 and the touch pressure data detected by the pressure sensing controller 600 are transmitted to the processor 700. The processor 700 controls the operation of the touch input device 1000 by using the touch position data and the touch pressure data as touch position information and touch pressure information.

As shown in the embodiment, when the converter 650 is implemented as a separate component, the converter 650 for implementing the touch input device 1000 with a desired specification can be selectively applied. Particularly, a high signal to noise ratio (SNR) can be obtained through use of a high performance ADC, so that the performance of the touch input device 1000 can be improved.

Second Embodiment

The touch input device 1000 according to a second embodiment includes the touch sensor panel 100, the pressure detection module 400, the position sensing controller 500, the converter 650 and a processor 701.

In the touch input device 1000 according to the second embodiment, the processor 701 includes the function of the pressure sensing controller sensing the touch pressure from the pressure detection module 400.

Here, the operation method of the position sensing controller 500 which detects the touch position from the touch sensor panel 100 is the same as that described above. That is, the position sensing controller 500 applies the driving signal Tx to the drive electrode of the touch sensor panel 100 and detects the touch position based on the sensing signal Rx obtained from the receiving electrode. Here, a converter for converting the sensing signal Rx into a digital signal may be included within the position sensing controller 500.

Also, the position sensing controller 500 may further include at least one integrator (not shown). The sensing signal Rx may be integrated by the integrator and may be converted into a digital signal by the converter provided within the position sensing controller 500.

In the second embodiment, the processor 701 applies the driving signal Tx-p to the drive electrode provided in the pressure detection module 400 and obtains the sensing signal Rx-p through the receiving electrode. Here, the sensing signal Rx-p is converted into a digital signal by the separately provided converter 650. The signal converted by the converter 650 is transmitted to the processor 701. The processor 701 generates touch pressure data based on the sensing signal Rx-p which has been converted into a digital signal.

As such, in the touch input device 1000 according to the second embodiment, the touch position detection is performed by the position sensing controller 500, and the touch pressure detection is performed by the processor 701. Here, the processor 701 performing the touch pressure detection is implemented separately from the converter 650 converting the sensing signal Rx-p from the pressure detection module 400 into a digital signal.

On the basis of not only the touch pressure data generated based on the signal transmitted from the separate converter 650 but the touch position data transmitted from the position sensing controller 500, the processor 701 controls the operation of the touch input device 1000 by using the touch position information and touch pressure information.

Also in the second embodiment, since the converter 650 is implemented as a separate component, the converter 650 for implementing the touch input device 1000 with a desired specification can be selectively applied. As described above, a high signal to noise ratio (SNR) can be obtained through use of a high performance ADC, so that the performance of the touch input device 1000 can be improved.

Further, in the second embodiment, since the processor 701 performs the function of the pressure sensing controller 600 of the first embodiment, the pressure sensing controller 600 is not required, so that a manufacturing cost can be reduced.

Third Embodiment

The touch input device 1000 according to a third embodiment includes the touch sensor panel 100, the pressure detection module 400, a touch controller 510, the converter 650 and the processor 700.

In the touch input device 1000 according to the third embodiment, the touch position detection and the touch pressure detection are controlled by the touch controller 510.

That is, in the touch position detection, the touch controller 510 applies the driving signal Tx to the drive electrode of the touch sensor panel 100 and obtains the sensing signal Rx from the receiving electrode. Here, the sensing signal Rx may be a signal coupled by the capacitance generated between the receiving electrode and the drive electrode of the touch sensor panel 100, to which the driving signal Tx has been applied. A converter for converting the sensing signal Rx into a digital signal may be included within the touch controller 510.

Also, the touch controller 510 may further include at least one integrator (not shown). The sensing signal Rx may be integrated by the integrator and may be converted into a digital signal by the converter provided within the position sensing controller 500.

Furthermore, the touch controller 510 has a function of detecting the touch pressure. That is, the touch controller 510 applies the driving signal Tx-p to the drive electrode within the pressure detection module 400 and obtains the sensing signal Rx-p through the receiving electrode.

In the touch pressure detection, the sensing signal Rx-p from the pressure detection module 400 is converted into a digital signal by the converter 650 provided separately from the touch controller 510. The signal converted by the converter 650 is transmitted to the touch controller 510, and then touch pressure data is generated.

The touch controller 510 transmits the touch position data and touch pressure data to the processor 700. The processor 700 controls the operation of the touch input device 1000 on the basis of the touch position data and touch pressure data.

Also in the third embodiment, since the converter 650 is implemented as a separate component, the converter 650 for implementing the touch input device 1000 with a desired specification can be selectively applied. As described above, a high signal to noise ratio (SNR) can be obtained through use of a high performance ADC, so that the performance of the touch input device 1000 can be improved.

Further, in the third embodiment, since the position sensing controller 500 and pressure sensing controller 600 of the first embodiment are implemented as a single component (touch controller 510), a manufacturing cost can be reduced.

In addition, since the sensing signal Rx for sensing the touch position and the sensing signal Rx-p for sensing the touch pressure are processed by a single component (touch controller 510), it is possible to ensure a better effect of obtaining more accurate data in real time by using the touch position information and the touch pressure information.

Fourth Embodiment

The touch input device 1000 according to a fourth embodiment includes the touch sensor panel 100, the pressure detection module 400, the position sensing controller 500, a pressure sensing controller 601 and the processor 700.

In the touch pressure detection of the touch input device 1000 according to the fourth embodiment, the configuration of the converter converting the sensing signal Rx-p obtained from the pressure detection module 400 into a digital signal is included in the pressure sensing controller 601.

The position sensing controller 500 applies the driving signal Tx to the drive electrode of the touch sensor panel 100 and obtains the sensing signal Rx from the receiving electrode, and then generates the touch position data.

Also, the position sensing controller 500 may include at least one integrator (not shown) and converter (not shown) therewithin. The sensing signal Rx is integrated by the integrator and is converted into a digital signal by the converter. The position sensing controller 500 generates the touch position data by the signal.

Meanwhile, the pressure sensing controller 601 applies the driving signal Tx-p to the drive electrode within the pressure detection module 400, and obtains the sensing signal Rx-p through the receiving electrode. Here, the pressure sensing controller 601 receives the sensing signal Rx-p through the receiving electrode and converts the received sensing signal Rx-p into a digital signal by using the converter 650 provided therewithin. Based on the converted signal, the pressure sensing controller 601 generates the touch pressure data.

The touch pressure data and touch pressure data which have been generated by the position sensing controller 500 and the pressure sensing controller 601 are transmitted to the processor 700. The processor 700 controls the operation of the touch input device 1000 on the basis of the transmitted data.

In the fourth embodiment, the pressure sensing controller 601 includes the function of the converter. This is effective for a case where a high SNR is not required unlike the first to third embodiments. That is, since the converter built in the pressure sensing controller 601 instead of a separate converter is used, a manufacturing cost can be reduced. Eventually, the fourth embodiment has the configuration that can be used the most efficiently when there is no requirement for a high SNR and the manufacturing cost is intended to be reduced.

Fifth Embodiment

The touch input device 1000 according to a fifth embodiment includes the touch sensor panel 100, the pressure detection module 400, the position sensing controller 500 and a processor 702.

In the touch input device 1000 according to the fifth embodiment, the processor 702 has a function of sensing the touch pressure from the pressure detection module 400 as well as controls the operation of the touch input device 1000.

The operation method of the position sensing controller 500 which detects the touch position from the touch sensor panel 100 is the same as that described above. The position sensing controller 500 applies the driving signal Tx to the drive electrode of the touch sensor panel 100 and detects the touch position based on the sensing signal Rx obtained from the receiving electrode.

Also, the position sensing controller 500 may include at least one integrator (not shown) and converter (not shown) therewithin. The sensing signal Rx is integrated by the integrator and is converted into a digital signal by the converter. The position sensing controller 500 generates the touch position data by the signal.

In the fifth embodiment, the processor 702 applies the driving signal Tx-p to the drive electrode provided in the pressure detection module 400 and obtains the sensing signal Rx-p through the receiving electrode. Here, since the processor 702 includes the converter therewithin, the processor 702 converts the received sensing signal Rx-p into a digital signal and generates the touch pressure data based on the converted digital signal.

On the basis of not only the touch pressure data generated by the processor 702 but the touch position data generated by the position sensing controller 500, the processor 702 controls the operation of the touch input device 1000.

In the fifth embodiment, the processor 702 includes the function of the converter. Similarly to the fourth embodiment, this is effective for a case where a high SNR is not required. That is, since the converter built in the processor 702 instead of a separate converter is used, a manufacturing cost can be reduced. Eventually, the fifth embodiment has the configuration that can be used the most efficiently when there is no requirement for a high SNR and the manufacturing cost is intended to be reduced.

Sixth Embodiment

The touch input device 1000 according to a sixth embodiment includes the touch sensor panel 100, the pressure detection module 400, a touch controller 520, and the processor 700.

In the touch input device 1000 according to the sixth embodiment, the touch position detection and the touch pressure detection are controlled by the touch controller 520.

That is, the touch controller 520 applies the driving signal Tx to the drive electrode of the touch sensor panel 100 and obtains the sensing signal Rx from the receiving electrode. Here, the sensing signal Rx may be a signal coupled by the capacitance generated between the receiving electrode and the drive electrode of the touch sensor panel 100, to which the driving signal Tx has been applied.

Also, the touch controller 520 may include two or more integrators (not shown) and two or more converters (not shown) therewithin. The sensing signal Rx is integrated by at least one integrator and is converted into a digital signal by at least one converter. The touch controller 520 generates the touch position data by the signal.

Furthermore, the touch controller 520 applies the driving signal Tx-p to the drive electrode within the pressure detection module 400 and obtains the sensing signal Rx-p through the receiving electrode. Here, the sensing signal Rx-p is converted into a digital signal by at least one converter provided in the touch controller 520. Based on the converted digital signal, the touch controller 520 generates the touch pressure data.

The touch controller 520 transmits the touch pressure data and the touch pressure data to the processor 700. The processor 700 controls the operation of the touch input device 1000 on the basis of the transmitted data.

In the sixth embodiment, since the position sensing controller 500 and pressure sensing controller 600 of the first embodiment are implemented as a single component (touch controller 520), a manufacturing cost can be reduced.

Also, in the sixth embodiment, the touch controller 520 includes the function of the converter. This is effective for a case where a high SNR is not required. That is, since the converter built in the touch controller 520 instead of a separate converter is used, a manufacturing cost can be reduced. The sixth embodiment has the configuration that can be used the most efficiently when there is no requirement for a high SNR and the manufacturing cost is intended to be reduced.

Furthermore, in the sixth embodiment, since the sensing signal Rx for sensing the touch position and the sensing signal Rx-p for sensing the touch pressure are processed by a single component (touch controller 520), it is possible to ensure a better effect of obtaining more accurate data in real time by using the touch position information and the touch pressure information.

Meanwhile, in the description and FIGS. 9 to 14 relating to the first to sixth embodiments, while it is shown and described that the driving signals Tx and Tx-p and the sensing signal Rx and Rx-p are transmitted through a plurality of lines, this is only for convenience of description. It is clear to those skilled in the art that at least two of the signals Tx, Tx-p, Rx, and Rx-p are transmitted through one line.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A smartphone comprising:
a cover layer;
an LCD panel which is located under the cover layer and comprises a liquid crystal layer, and a first glass layer and a second glass layer between which the liquid crystal layer is placed, wherein at least a portion of a touch sensor which senses touch in a capacitive manner is located between the first glass layer and the second glass layer;
a backlight unit which is located under the LCD panel;
a pressure electrode which is located under the backlight unit;
a shielding member which is located under the pressure electrode; and
a converter which converts a signal comprising information for a change amount of capacitance outputted from the pressure electrode to a digital signal,
wherein the touch sensor comprises a plurality of drive electrodes and a plurality of receiving electrodes,
wherein a driving signal is applied to the touch sensor and a touch position is detected from a sensing signal which is outputted from the touch sensor,
wherein a magnitude of a touch pressure is detected from the digital signal,
wherein a reference potential layer is located within a display module comprising the LCD panel and the backlight unit,
and wherein the capacitance change amount changes depending on a distance between the pressure electrode and the reference potential layer.

2. The smartphone of claim 1, wherein the at least a portion of the touch sensor located between the first glass layer and the second glass layer is at least one of the drive electrode and the receiving electrode.

3. A smartphone comprising:
a cover layer;
an LCD panel which is located under the cover layer and comprises a liquid crystal layer, and a first glass layer and a second glass layer between which the liquid crystal layer is placed, wherein at least a portion of a touch sensor which senses touch in a capacitive manner is located between the first glass layer and the second glass layer;
a backlight unit which is located under the LCD panel;
a pressure electrode which is located under the backlight unit;
a shielding member which is located under the pressure electrode; and
a converter which converts a signal comprising information for a change amount of capacitance outputted from the pressure electrode to a digital signal,
wherein the touch sensor comprises a plurality of drive electrodes and a plurality of receiving electrodes,
wherein a driving signal is applied to the touch sensor and a touch position is detected from a sensing signal which is outputted from the touch sensor,
wherein a magnitude of a touch pressure is detected from the digital signal,
wherein the LCD panel further comprises a first polarizer layer and a second polarizer layer between which the first glass layer, the liquid crystal layer and the second glass layer are placed,
and wherein the remaining portion other than the at least a portion of the touch sensor is located between the first glass layer and the first polarizer layer.

4. The smartphone of claim 3, wherein the shielding member is a reference potential layer, and wherein the change amount of the capacitance changes depending on a distance between the pressure electrode and the reference potential layer.

5. The smartphone of claim 3, further comprising a spacer layer located in at least one place among a place between the pressure electrode and the shielding member and a place between the pressure electrode and a display module comprising the LCD panel and the backlight unit.

6. The smartphone of claim 1, wherein the pressure electrode comprises a plurality of electrodes constituting a plurality of channels.

7. A smartphone comprising:
a cover layer;
an LCD panel which is located under the cover layer and comprises a liquid crystal layer, and a first glass layer and a second glass layer between which the liquid crystal layer is placed, wherein at least a portion of a touch sensor which senses touch in a capacitive manner is located between the first glass layer and the second glass layer;

a backlight unit which is located under the LCD panel and comprises a light source and a reflection plate;

a pressure electrode which is located under the backlight unit;

a shielding member which is located under the pressure electrode; and a converter which converts a signal comprising information for a change amount of capacitance outputted from the pressure electrode to a digital signal, wherein the touch sensor comprises a plurality of drive electrodes and a plurality of receiving electrodes, and further comprising:

a drive unit which applies a driving signal to the touch sensor;

a sensing unit which receives a sensing signal from the touch sensor and detects a touch position; and a pressure detector which detects a magnitude of a touch pressure from the digital signal, wherein the converter and the pressure detector are provided as separate components, wherein a reference potential layer is located within a display module comprising the LCD panel and the backlight unit, and wherein the capacitance change amount changes depending on a distance between the pressure electrode and the reference potential layer.

8. The smartphone of claim 7, wherein the at least a portion of the touch sensor located between the first glass layer and the second glass layer is at least one of the drive electrode and the receiving electrode.

9. A smartphone comprising:

a cover layer;

an LCD panel which is located under the cover layer and comprises a liquid crystal layer, and a first glass layer and a second glass layer between which the liquid crystal layer is placed, wherein at least a portion of a touch sensor which senses touch in a capacitive manner is located between the first glass layer and the second glass layer;

a backlight unit which is located under the LCD panel and comprises a light source and a reflection plate;

a pressure electrode which is located under the backlight unit;

a shielding member which is located under the pressure electrode; and a converter which converts a signal comprising information for a change amount of capacitance outputted from the pressure electrode to a digital signal, wherein the touch sensor comprises a plurality of drive electrodes and a plurality of receiving electrodes, and further comprising:

a drive unit which applies a driving signal to the touch sensor;

a sensing unit which receives a sensing signal from the touch sensor and detects a touch position; and a pressure detector which detects a magnitude of a touch pressure from the digital signal, wherein the converter and the pressure detector are provided as separate components, wherein the LCD panel further comprises a first polarizer layer and a second polarizer layer between which the first glass layer, the liquid crystal layer and the second glass layer are placed, and wherein the remaining portion other than the at least a portion of the touch sensor is located between the first glass layer and the first polarizer layer.

10. The smartphone of claim 9, wherein the shielding member is a reference potential layer, and wherein the change amount of the capacitance changes depending on a distance between the pressure electrode and the reference potential layer.

11. The smartphone of claim 9, further comprising a spacer layer located in at least one place among a place between the pressure electrode and the shielding member and a place between the pressure electrode and a display module comprising the LCD panel and the backlight unit.

12. The smartphone of claim 7, wherein the pressure electrode comprises a plurality of electrodes constituting a plurality of channels.

13. A smartphone comprising:

a cover layer;

an LCD panel which is located under the cover layer and comprises a liquid crystal layer, and a first glass layer and a second glass layer between which the liquid crystal layer is placed, wherein at least a portion of a touch sensor which senses touch in a capacitive manner is located between the first glass layer and the second glass layer;

a backlight unit which is located under the LCD panel;

a pressure electrode which is located under the backlight unit;

a reference potential layer spaced from the pressure electrode; and a converter which converts a signal comprising information for a change amount of capacitance outputted from the pressure electrode to a digital signal, wherein the touch sensor comprises a plurality of drive electrodes and a plurality of receiving electrodes, wherein a driving signal is applied to the touch sensor and a touch position is detected from a sensing signal which is outputted from the touch sensor, wherein a magnitude of a touch pressure is detected from the digital signal, and wherein the change amount of the capacitance changes depending on a distance between the pressure electrode and the reference potential layer, and wherein the reference potential layer is located within a display module comprising the LCD panel and the backlight unit.

14. The smartphone of claim 13, wherein the at least a portion of the touch sensor located between the first glass layer and the second glass layer is at least one of the drive electrode and the receiving electrode.

15. A smartphone comprising:

a cover layer;

an LCD panel which is located under the cover layer and comprises a liquid crystal layer, and a first glass layer and a second glass layer between which the liquid crystal layer is placed, wherein at least a portion of a touch sensor which senses touch in a capacitive manner is located between the first glass layer and the second glass layer;

a backlight unit which is located under the LCD panel;

a pressure electrode which is located under the backlight unit;

a reference potential layer spaced from the pressure electrode; and a converter which converts a signal comprising information for a change amount of capacitance outputted from the pressure electrode to a digital signal, wherein the touch sensor comprises a plurality of drive electrodes and a plurality of receiving electrodes, wherein a driving signal is applied to the touch sensor and a touch position is detected from a sensing signal which is outputted from the touch sensor, wherein a magnitude of a touch pressure is detected from the digital signal, wherein the change amount of the capacitance changes depending on a distance between the pressure electrode and the reference potential layer, wherein the LCD panel further comprises a first polarizer layer and a second polarizer layer between which the first glass layer, the liquid crystal layer and the second glass layer are placed, and wherein the remaining portion other than the at least a portion of the touch sensor is located between the first glass layer and the first polarizer layer.

16. The smartphone of claim 15, wherein the reference potential layer is located under the pressure electrode.

17. The smartphone of claim 13, further comprising a spacer layer located between the pressure electrode and the reference potential layer.

18. The smartphone of claim 13, wherein the pressure electrode comprises a plurality of electrodes constituting a plurality of channels.

19. The smartphone of claim 1, further comprising a spacer layer located between the pressure electrode and the reference potential layer.

20. The smartphone of claim 3, wherein the pressure electrode comprises a plurality of electrodes constituting a plurality of channels.

21. The smartphone of claim 7, further comprising a spacer layer located between the pressure electrode and the reference potential layer.

22. The smartphone of claim 9, wherein the pressure electrode comprises a plurality of electrodes constituting a plurality of channels.

23. The smartphone of claim 13, further comprising a spacer layer located between the pressure electrode and the reference potential layer.

24. The smartphone of claim 15, wherein the pressure electrode comprises a plurality of electrodes constituting a plurality of channels.

* * * * *